(12) United States Patent
Gauf et al.

(10) Patent No.: US 10,678,666 B1
(45) Date of Patent: Jun. 9, 2020

(54) METHOD AND SYSTEM FOR IMPLEMENTING AUTOMATED TEST AND RETEST PROCEDURES IN A VIRTUAL TEST ENVIRONMENT

(71) Applicant: Innovative Defense Technologies, LLC, Arlington, VA (US)

(72) Inventors: Bernard Gauf, Vienna, VA (US); Elfriede Dustin, Springfield, VA (US); David Zwacki, New Bedford, MA (US)

(73) Assignee: INNOVATIVE DEFENSE TECHNOLOGIES, LLC, Arlington, VA (US)

( * ) Notice: Subject to any disclaimer, the term of this patent is extended or adjusted under 35 U.S.C. 154(b) by 685 days.

(21) Appl. No.: 13/718,295

(22) Filed: Dec. 18, 2012

Related U.S. Application Data

(63) Continuation-in-part of application No. 13/605,182, filed on Sep. 6, 2012, now Pat. No. 8,826,084.

(60) Provisional application No. 61/577,298, filed on Dec. 19, 2011, provisional application No. 61/531,769, filed on Sep. 7, 2011.

(51) Int. Cl.
*G06F 11/263* (2006.01)
*G06F 11/36* (2006.01)

(52) U.S. Cl.
CPC ...... *G06F 11/2635* (2013.01); *G06F 11/3688* (2013.01)

(58) Field of Classification Search
CPC ............................ G06F 11/263; G06F 11/3684
USPC .............................. 702/123; 714/32, E11.177
See application file for complete search history.

(56) References Cited

U.S. PATENT DOCUMENTS

| | | | |
|---|---|---|---|
| 5,678,002 A | 10/1997 | Fawcett et al. | |
| 5,781,720 A | 7/1998 | Parker et al. | |
| 6,807,506 B2* | 10/2004 | Sutton et al. | 702/123 |
| 7,548,979 B2 | 6/2009 | Hanners et al. | |
| 2002/0162059 A1* | 10/2002 | McNeely et al. | 714/703 |
| 2003/0031992 A1 | 2/2003 | Laferriere et al. | |
| 2004/0160438 A1 | 8/2004 | Shih et al. | |

(Continued)

OTHER PUBLICATIONS

Marchall et al., Advanced Server Virtualization: VMware and Microsoft Platforms in the Virtual Data Center, CRC Press, May 17, 2006.*

(Continued)

*Primary Examiner* — Michael J Dalbo
(74) *Attorney, Agent, or Firm* — Hunton Andrews Kurth LLP

(57) ABSTRACT

According to an embodiment of the present invention, a computer implemented method and system for automated test and retesting in a virtual test environment, comprises: an input interface, comprising at least one processor, configured to receive one or more commands from a user, wherein the one or more commands comprise at least one test procedure and at least one system version parameter; a test and retest engine, comprising at least one processor, configured to execute the one or more commands on at least one system under test on a virtual environment based at least in part on the at least one system version parameter; and an output interface, comprising at least one processor, configured to receive results data responsive to execution of the one or more commands and further configured to display the results to the user.

12 Claims, 32 Drawing Sheets

(56) References Cited

U.S. PATENT DOCUMENTS

| | | | |
|---|---|---|---|
| 2006/0095949 A1 | 5/2006 | Whish-Wilson et al. | |
| 2007/0220347 A1* | 9/2007 | Kirtkow | G06F 11/3684 |
| | | | 714/38.14 |
| 2009/0217263 A1* | 8/2009 | Gebhart | G06F 9/4445 |
| | | | 718/1 |
| 2009/0235122 A1 | 9/2009 | Rovang et al. | |
| 2009/0276771 A1* | 11/2009 | Nickolov | G06F 9/4856 |
| | | | 717/177 |
| 2010/0077260 A1* | 3/2010 | Pillai | G06F 11/263 |
| | | | 714/46 |
| 2011/0083122 A1* | 4/2011 | Chen | G06F 11/3664 |
| | | | 717/124 |
| 2011/0088014 A1* | 4/2011 | Becker | G06F 11/3684 |
| | | | 717/125 |
| 2011/0296382 A1* | 12/2011 | Pasternak | G06F 11/3688 |
| | | | 717/124 |

OTHER PUBLICATIONS

Memon, A.M. (2001). A Comprehensive Framework for Testing Graphical User Interfaces, See pp. 16, 18, 116, 117.

Takahashi, J. (Nov. 2002). Effective automated testing: a solution of graphical object verification. Test Symposium,(ATS '02). Proceedings of the 11th Asian , pp. 284-291.

Ivory, M. Y. (2001). State of the Art in Automating Usability Evaluation of User Interfaces, ACM Computing Surveys.

* cited by examiner

METHOD AND SYSTEM FOR IMPLEMENTING AUTOMATED TEST AND RETEST PROCEDURES IN A VIRTUAL TEST ENVIRONMENT

CROSS REFERENCES TO RELATED APPLICATIONS

This application claims priority to Provisional Application No. 61/577,298 filed on Dec. 19, 2011. The contents of this priority application are incorporated herein by reference in their entirety.

This application is a continuation-in-part of U.S. patent application Ser. No. 13/605,182, filed on Sep. 6, 2012, which claims priority to Provisional Application No. 61/531,769 filed on Sep. 7, 2011. The contents of these applications are incorporated herein by reference in their entirety.

STATEMENT REGARDING FEDERALLY SPONSORED RESEARCH OR DEVELOPMENT

This invention was made with Government support under contract N00024-11-G-4226 awarded by U.S. Navy. The Government has certain rights in the invention.

FIELD OF THE INVENTION

The present invention relates generally to automated test and retest procedures and more specifically to an integrated development environment for automated testing in a virtual environment.

BACKGROUND OF THE INVENTION

Commercial and military systems today are largely software based and growing in complexity. However, despite advances in development practices and tools, the goals of accelerating the rate at which systems can be delivered and reducing their costs cannot be met by simply writing software faster. Delivering faster, cheaper, and higher quality software will only be met with comparable improvements in the practices and tools for automated testing and analysis. Current systems require constant supervision of testing software by trained individuals. Oftentimes, the testing procedures are time-consuming and burdensome. For example, one change for a certain discrete function may affect many other functions of a system, and thereby requiring testing of not just the discrete function but of all the other functions. Thus, considerably time and effort are needed by trained individuals to properly test complex software systems.

Other drawbacks may also be present.

SUMMARY OF THE INVENTION

Accordingly, one aspect of an embodiment of the present invention is to address one or more of the drawbacks set forth above. According to an exemplary embodiment, a method and system for automated test and retesting using an interactive interface provided by a computer processor comprises: an input interface, comprising at least one processor, configured to receive one or more commands from a user, wherein the one or more commands comprise at least one test procedure and at least one system version parameter; a test and retest engine, comprising at least one processor, configured to execute the one or more commands on at least one system under test on a virtual environment based at least in part on the at least one system version parameter; and an output interface, comprising at least one processor, configured to receive results data responsive to execution of the one or more commands and further configured to display the results to the user.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

Figure 1:
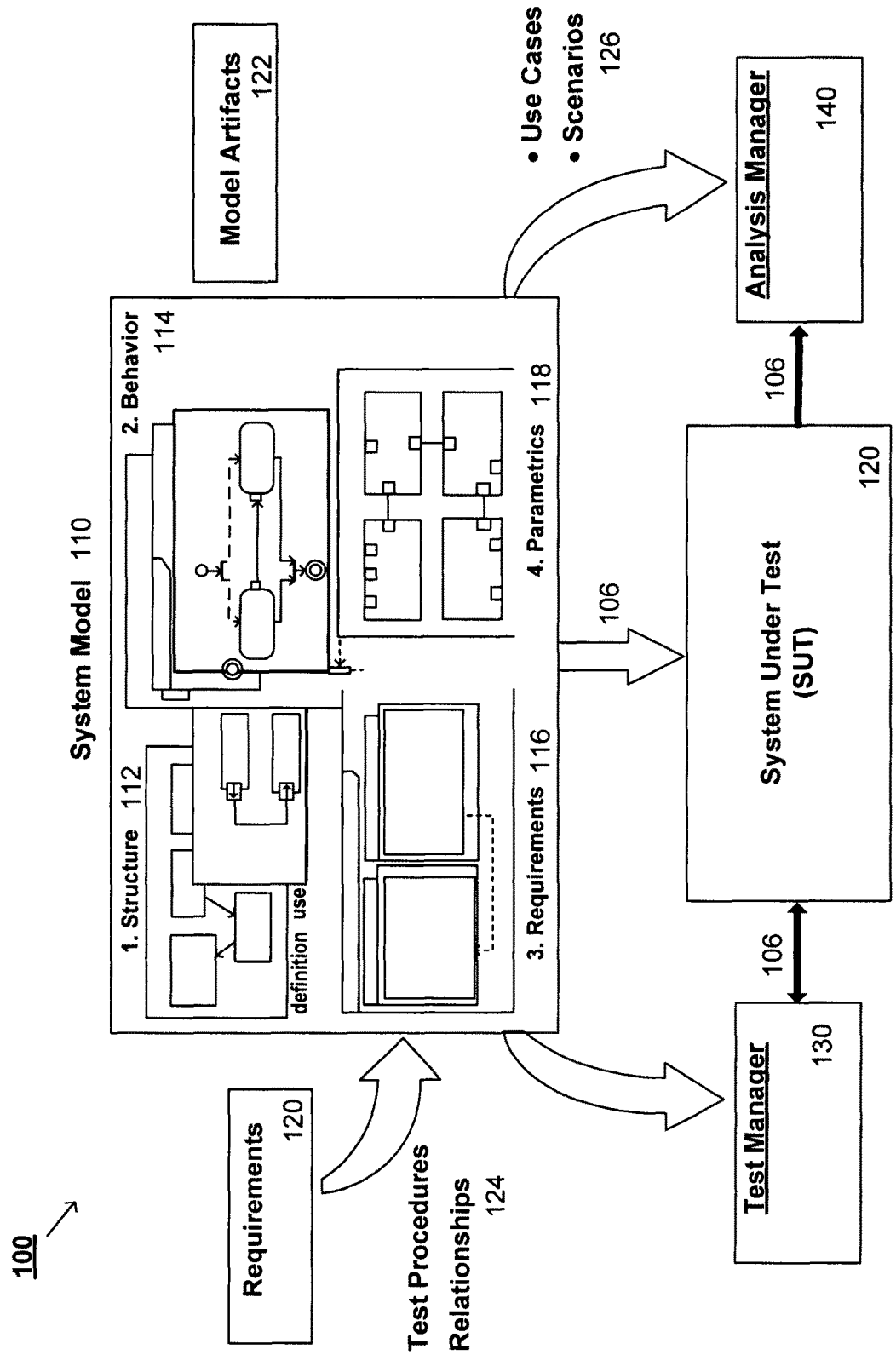
FIG. 1 is an exemplary diagram of a system for model-driven automated software testing, according to an embodiment of the present invention.

An embodiment of the present invention is directed to an Automated Test and Re-Test (ATRT) process and suite of technologies to address automated testing of large complex systems and systems-of-systems. A focus of the ATRT system is directed to reducing time and effort involved in conducting system integration and testing while expanding the depth and breadth of test requirement coverage. As a result, projects demonstrate a substantial reduction in test time while expanding test requirement coverage.

An embodiment of the present invention provides users, such as manual testers, the ability to automate test procedures without having to be software developers themselves. A system of an embodiment of the present invention provides a highly scalable solution that may run 10 or 10000s of tests connecting to any number of displays and servers and further provide automated analysis for 100s of test outcomes or 10000s or more. An embodiment of the present invention can test systems independent of an operating system or a platform and further support various cloud computing and other environments, thereby providing improved customization and configuration. Whether a user needs to write a plug-in to a modeling tool, defect tracking tool or requirements management solution, etc., an embodiment of the present invention may be easily extensible to allow for these additional integration features. Accordingly, any desired tool enhancements and features may be implemented on demand. Moreover, an embodiment of the present invention may be non-intrusive to the System under Test (SUT) in that it reduces or even eliminates modifications to the SUT configuration.

An embodiment of the present invention allows the same or similar test scenarios to run repeatedly with different data sets (e.g., boundary testing, equivalence partitioning, etc.). According to an exemplary application, model driven automated testing allows test flows to be generated via a simple point and click model driven interface solution. An embodiment of the present invention, thus, addresses various complex testing challenges of software systems by providing an innovative technical solution that solves testing problems of complex software systems. For example, testing of a heterogeneous multicomputer environment while providing an integrated solution which includes a tool suite may be achieved and engineering services may be applied across the entire testing lifecycle.

Model-driven automated software testing automates control of a system test via a Test Manager and analysis management of resulting test data via an Analysis Manager. A central System Model manages requirements, use cases and/or other information that encapsulates behaviors of a System Under Test (SUT). An auto-code generator may leverage the System Model and automatically generate code for efficient development of test cases. Once system modeling and metadata are complete, test flows may be created for a Test Manager and analysis flows may be created for an Analysis Manager.

A Test Flow may be a collection of one to many actions arranged to satisfy a specific goal. Test cases, test steps, and functions may each have corresponding Test Flows. Each Test Flow may in turn contain other Test Flows, such as test cases containing test steps, or a test step containing a function. Test Flows may be simple and linear, or may be complex, using conditional constraints or forks and joins to determine behavior.

Test Manager automates large scale system tests through execution of defined Test Flows by providing automated control over system displays and system control messages. The user may execute a predefined Test Flow which comes directly from the System Model, or the user may generate their own Test Flow using a repository of system actions. The Test Manager may then execute the Test Flow on the SUT and report the performance of each step within that flow.

Analysis Manager may perform various functions, such as extract, map, and link the fundamental data for testing from the SUT recorded raw data. Analysis Manager may then assess the data against Analysis Flows generated from the System model. System performance may be analyzed when the SUT data is executed through the verification and requirement steps defined in the Analysis Flows. Analysis Manager may then output a series of integrated reports and plots. An embodiment of the present invention recognizes that with the increase of test coverage comes an increase of test results that needs to be analyzed. Thus, an automated reporting capability on the increased test coverage and outcome, comparing expected versus actual results may be provided.

An embodiment of the present invention may combine Graphical User Interface (GUI) and non-GUI automated testing. GUI and message based testing capability for Systems Under Test (SUTs) may be provided when GUIs are unavailable or when GUI test automation is not beneficial, and Message Based testing is a viable solution. Also, GUI based automated testing may be enhanced with Message Based testing. Messages may include any message in any form that is sent from one device to another device through a network connection. Messages may include text, images, audio, video and/or other form of data, as well as various combinations thereof. Distributed testing over a network may involve automated tests executed over a network. For an exemplary test case, various GUI or message based outputs may be dependent on each other over a network. An example may involve: GUI output 1 is a prerequisite to GUI output 2, or to test other serial or parallel message or GUI based interactions. Concurrent testing support may be provided, for the test case where various test scenarios may run in parallel and race-conditions and other concurrency issues have to be detected, and simulation of live SUT interaction may be required. A batch processing feature may be provided for the case when various test cases may be executed together as a batch job as part of endurance or longevity testing.

An embodiment of the present invention provides script-less automated testing. For example, software testing code may be automatically generated for the tester through simple point and click features. With a "capture playback" feature, a baseline test code may be generated behind the scenes and may then be re-used for regression testing for each subsequent SUT release. Keyword driven automated testing may reduce test creation time significantly, and may further enable the tester to generate automated test code via simple clicks of test related test "action" icons as part of a test scenario. Code may be generated behind the scene and may be automatically added to the automated test baseline. Also, keyword driven testing allows for conformity of testing scripts across the board and increases maintainability of automated test scripts. Input test data may be grouped into boundaries: e.g., valid, invalid, boundary, one off boundary and so forth. An embodiment of the present invention recognizes that most defects congregate around boundary values of data input. Thus, a manual testing challenge is that there is often not enough time to cover the boundaries or equivalence classes of test data input combinations. With data driven testing feature of an embodiment of the present invention, one test scenario may be reused over and over with different data values and data combinations. The model-driven automated testing capability of an embodiment of the present invention allows complex test flows (e.g., loops, conditionals, etc.) to be designed via a model driven interface via simple point/click/drag, e.g., test creation and execution via a workflow/flowchart user interface.

FIG. 1 is an exemplary diagram of a system for model-driven automated software testing, according to an embodiment of the present invention. A system 100 of an embodiment of the present invention may include a System Model 110. As illustrated in FIG. 1, system 100 may include user communication devices associated with one or more users accessing the System Model 110 of an embodiment of the present invention. The user may establish a communication session with a communication device via a communication network 106.

System Model 110 may be accessed by a user communication device, such as a computer, a personal computer, a laptop, a cellular communication device, a workstation, a mobile device, a phone, a handheld PC, a personal digital assistant ("PDA"), a thin system, a fat system, a network appliance, an Internet browser, or other any other device that may allow a user to communicate with an application system and the plurality of communication devices (e.g., computer, wireless mobile communication device, etc.) associated with other users via the communication network 106.

A communication network 106 may be coupled to System Model 110 and one or more communication devices (e.g., user communication devices, etc.). SUT 120 may communicate with Test Manager 130 and Analysis Manager 140 via communication network 106. The communication network 106 may be a wireless network, a wired network or any combination of wireless network and wired network. For example, the communication network 106 may include one or more of a public switched telephone network (PTSN), a signaling system #7 (SS7) network, a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 106 may include, without limitation, telephone line, fiber optics, IEEE Ethernet 802.3, wide area network ("WAN"), local area network ("LAN"), or global network such as the Internet. The communication network 106 may support an Internet network, a wireless communication network, a cellular network, or the like, or any combination thereof. The communication network 106 may further include one, or any number of the exemplary types of networks mentioned above operating as a stand-alone network or in cooperation with each other. The communication network 106 may include a plurality of mobile switching centers (MSCs) and a plurality of signaling control points (SCPs).

The communication network 106 may utilize one or more protocols of one or more network elements to which it is communicatively coupled. The communication network 106 may translate to or from other protocols to one or more protocols of network devices. Although the communication network 106 is depicted as one network, it should be appreciated that according to one or more embodiments, the communication network 106 may comprise a plurality of interconnected networks, such as, for example, a service provider network, the Internet, a broadcaster's network, a cable television network, corporate networks, and home networks.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System Model 110 may access databases and/or other sources of information in accordance with an embodiment of the present invention. The databases may be further combined and/or separated. The databases may reside at a single location or separated through multiple locations. In addition, the databases may be supported by an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Data and information may be stored and cataloged in Databases which may comprise or interface with a searchable database. Databases may comprise, include or interface to a relational database. Other databases, such as a query format database, a Standard Query Language (SQL) format database, a storage area network (SAN), or another similar data storage device, query format, platform or resource may be used. Databases may comprise a single database or a collection of databases, dedicated or otherwise. In one embodiment, Databases may store or cooperate with other databases to store the various data and information described herein. In some embodiments, Databases may comprise a file management system, program or application for storing and maintaining data and information used or generated by the various features and functions of the systems and methods described herein. In some embodiments, Databases may store, maintain and permit access to customer information, transaction information, account information, and general information used to process transactions as described herein. In some embodiments, Databases is connected directly to System Model, which, in some embodiments, it is accessible through a network, such as communication network, e.g., 106 illustrated in FIG. 1, for example.

As shown in FIG. 1, Model-Driven Automated Software Testing (AST) technology automates scenario control of a system test (via Test Manager 130) as well as analysis management of the resulting test data (via Analysis Manager 140). A central System Model 110 manages the system test flows, requirements, and analysis behavioral threads (e.g., system Use Cases), when combined define a test procedure. An embodiment of the present invention may be directed to an auto-code generator that leverages the model and automatically generates code that may be compiled into the software suite. Auto-generation allows for rapid development of test cases and utilizes a centralized system engineering architecture.

Exemplary features of the model-driven process may include: robust AST process to address any complex system; full AST solution from scenario control to performance reporting; and AST solution generated from centrally managed model. Using this process, with a non-intrusive integration with the SUT, a user may control an entire test of complex systems as well as perform analysis from one tool.

As shown in FIG. 1, System Model 110 may include various modules and components. In this exemplary illustration, System Model 110 may include Structure 112, Behavior 114, Requirements 116 and Parametrics 118. System requirements, shown by 120, may be received by System Model 110. System requirements may include test procedures, relationships and/or descriptive testing metadata. System Model 110 may then manage various systems requirements, system behaviors, and system tests. According to an exemplary implementation, System Model 110 may include a Systems Modeling Language tool or other modeling language tool, or may even include a home-grown model or other customized model. Regardless, standard system engineering modeling practices may be supported, and system requirements may be read in and linked directly within System Model 110.

System Model 110 may define numerous Industry standard artifacts and/or other artifacts, as represented by Model Artifacts 122. Model Artifacts 122 may include use cases, requirements traceability, activity diagrams, sequence diagrams, verification steps, test procedures and/or other information that encapsulate behaviors of the System Under Test (SUT). An embodiment of the present invention may utilize an approach that incorporates descriptive metadata into the model to facilitate auto-code generator.

Once the system modeling and metadata are complete for a project, Test Flows may be created for Test Manager 130, and Analysis Flows may be created for Analysis Manager 140. According to an embodiment of the present invention, a Test Flow may describe the series of events for controlling and testing the SUT and SUT environment while under test. Analysis Flows may describe detailed verification steps for completing assessment of internal requirements and algorithms of the SUT.

Test Manager 130 may be used to automate large scale system tests through execution of defined Test Flows by providing automated control over system displays and system control messages. Some of the displays and messages drive system simulators or system consoles that may be used for full closed-loop testing. A user may manage a Test Flow within the Test Manager. For example, the user may execute a predefined Test Flow which comes from the System Model, or the user may generate their own Test Flow using a repository of system actions. The Test Manager may then execute the Test Flow on the SUT and report the performance of each step within that flow.

Analysis Manager 140 may automate data analysis, performance assessment, and expand test coverage for lower-level software and algorithm requirements levied within the SUT. Analysis Manager 140 may perform various functions, such as extract, map, and link the fundamental data for testing from the SUT recorded raw data. Typically, raw data sets from multi-day test events may be enormous in size and often contain windows of erroneous data caused by software and hardware failures during test time. Isolating and organizing the data allows for timely evaluation and analysis. Analysis Manager 140 may then assess the data against Analysis Flows generated from the System model. System performance may be analyzed when the SUT data is executed through the verification and requirement steps defined in the Analysis Flows. Also, Analysis Manager 140 may receive use cases, scenarios and/or other data from System Model 110. Analysis Manager 140 may then output a series of integrated reports and plots. These reports may include requirements, pass/fail reports, verification methods for each requirement within the reports, system performance analysis results, and plots which characterize the events.

Test Manager 130 may provide automated control over system displays and system control messages while the system is under test. Some of the displays and messages may drive system simulators or system consoles for full closed-loop testing. Test Manager 130 may record Test Flows and playback back graphically at a later time. This may include capturing and analyzing send/receive messages that drive the SUT and SUT stimulus. The capture and playback functionality may be used when conducting interface testing within a system, or interoperability tests between multiple systems. For example, messages may be recorded and processed through Test Manager 130 during the test to record and analyze the messages before a different subscriber system receives the messages. Messages may include sending and receiving scenario control messages; simulation control messages; heartbeat/health messages, for example.

Figure 2:
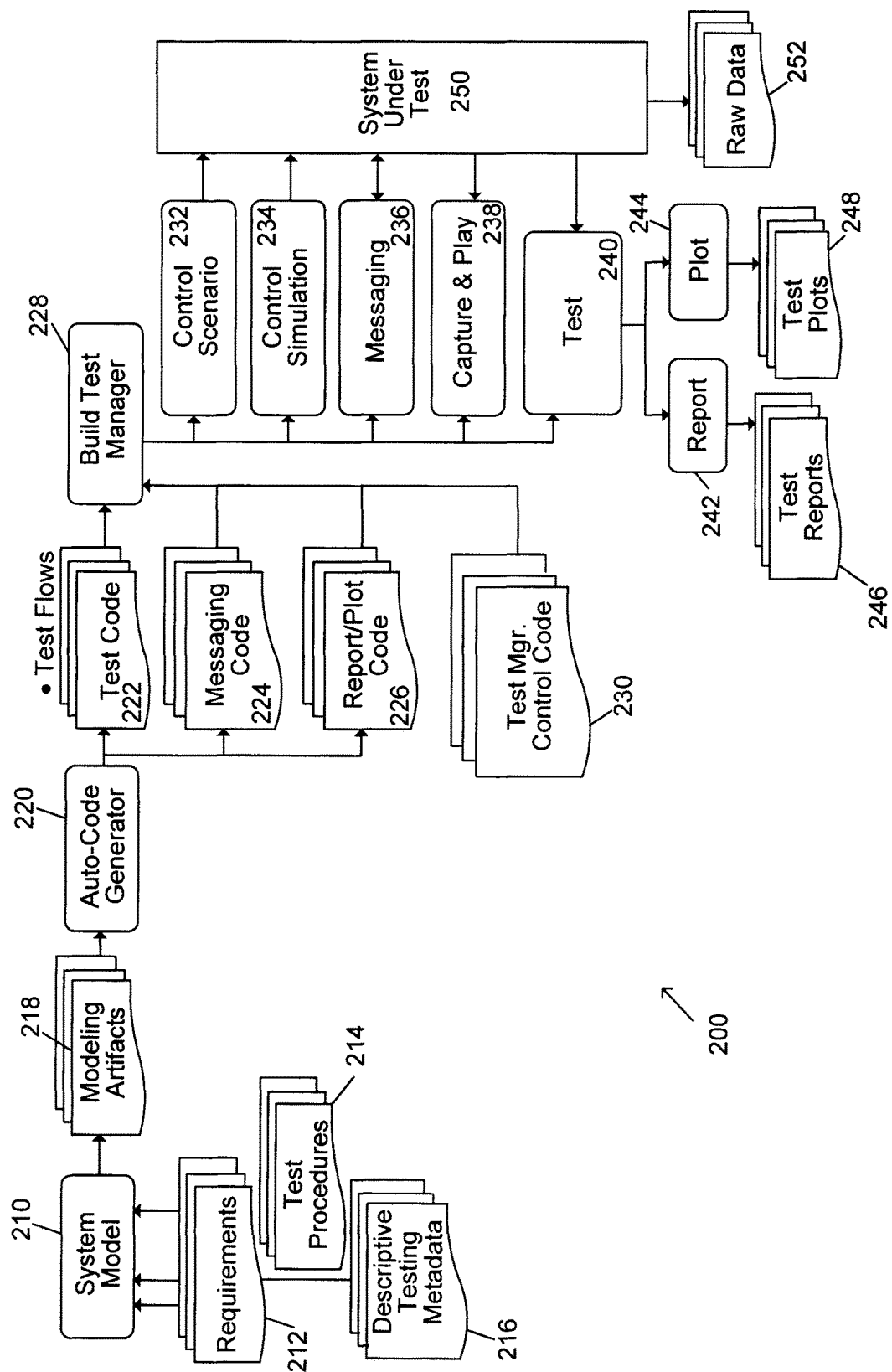
FIG. 2 is an exemplary flowchart for illustrating a model-driven Test Manager process, according to an embodiment of the present invention.

FIG. 2 is an exemplary flowchart for illustrating a model-driven Test Manager process, according to an embodiment of the present invention. This method is provided by way of example, as there are a variety of ways to carry out the methods described herein. Method 200 shown in FIG. 2 may be executed or otherwise performed by one or a combination of various systems. The method 200 may be carried out through system 100 of FIG. 1 by way of example. Each block shown in FIG. 2 represents one or more processes, methods, or subroutines carried out in method 200.

The process may include automatically generating software from modeling artifacts and additional metadata. The code generated from System Model may provide a significant cost, schedule, and technical advantage over existing testing and analysis capabilities. Once a Test Flow is established, Test Manager 130 may execute control commands via the system's pre-existing displays/GUIs and capture and record these actions. The records may be used to playback the test at a later time. From existing simulators (e.g., stimulus injection) and consoles, the SUT may operate and extract raw data which the Analysis Manager may then process.

As shown in FIG. 2, one or more inputs may be received by System Model, as shown by 210. In this example, the inputs may include Requirements 212, Test Procedures 214 and Descriptive Testing Metadata 216. Requirements 212 and Test Procedures 214 may be project specific. Modeling artifacts, as shown by 218, may be generated, which may include use cases, activity diagrams, sequence diagrams, mapped requirements and/or other data. Using this data, auto-code generator may be implemented at step 220. From the auto-code generator, various test flows may be created, such as Test Code 222, Messaging Code 224 and Report/Plot Code 226. The test flows may be project specific. Outputs from the test flows may be used to build Test Manager, at 228. Test Manager control code 230 may be received and used to build Test Manager as well. Test manager control code may include code related to framework, control, data management, capture and play, pass/fail, defect, statistics and/or other data. Test Manager may then manage various functions, such as Control Scenario at 232, Control Simulation at 234, Messaging at 236, Capture and Play at 238 and Test at 240. System Under Test (SUT) is shown at 250 and may output raw data 252. Test 240 may verify requirements, for example. Outputs may include reports 242, such as test reports 246 including summary, pass/fail, event reconciliation, defect reporting and/or other reports. Test Plots 248 may include performance and events reconciliation. Other types of reports and plots may be implemented.

Figure 3:
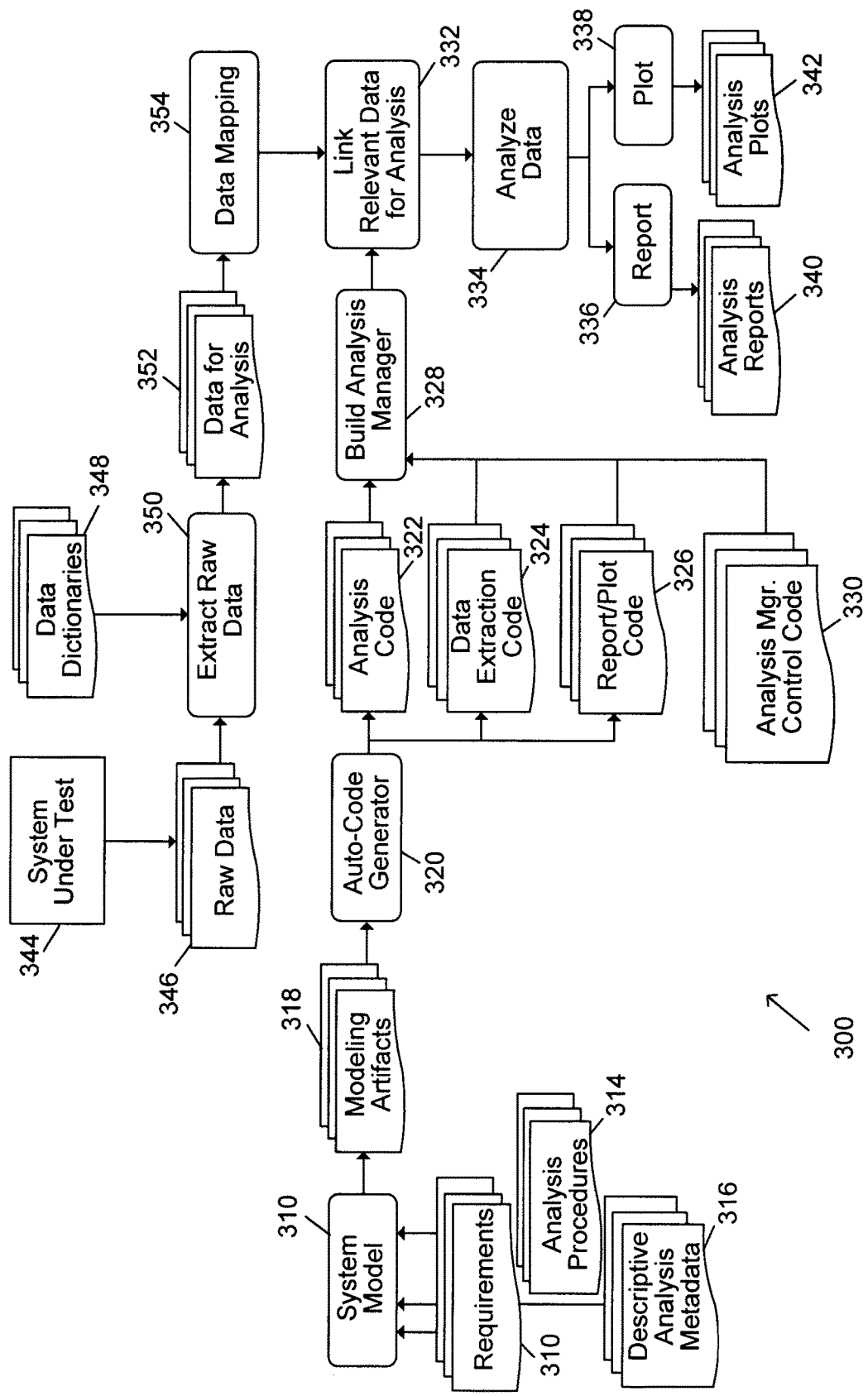
FIG. 3 is a flowchart illustrating an exemplary detailed Analysis Manager process flow, according to an embodiment of the present invention.

FIG. 3 is a flowchart illustrating an exemplary detailed Analysis Manager process flow, according to an embodiment of the present invention. This method is provided by way of example, as there are a variety of ways to carry out the methods described herein. Method 300 shown in FIG. 3 may be executed or otherwise performed by one or a combination of various systems. The method 300 may be carried out through system 100 of FIG. 1 by way of example. Each block shown in FIG. 3 represents one or more processes, methods, or subroutines carried out in method 300.

One or more inputs may be received by System Model, as shown by step 310. In this example, the inputs may include Requirements 312, Analysis Procedures 314 and Descriptive Analysis Metadata 316. Requirements 312 and Analysis Procedures 314 may be project specific. Modeling artifacts, as shown by 318, may be generated, which may include use cases, activity diagrams, sequence diagrams, mapped requirements and/or other data. Using this data, auto-code generator may be implemented at step 320. The process may include automatically generating software from the modeling artifacts and additional metadata. From the auto-code generator, various analysis flows may be created, such as Analysis Code 322, Data Extraction Code 324 and Report/Plot Code 326. Outputs from the analysis flows may be used to build Analysis Manager, at 328. Also, analysis manager control code 330 may be received and used to build Analysis Manager as well. Analysis manager control code may include code related to control, data management, pass/fail, statistics and/or other data. System Under Test (SUT) 344 may generate raw data, as shown by 346. Data Dictionaries, shown at 348, may also provide data at 350. Data Dictionaries may include data and/or instructions to process raw data 346. The collected data may then be analyzed, at 352, in the form of data mapping at 354. Analysis Manager may then link relevant data for analysis at 332. Data analysis may be performed at 334, which may include verifying requirements and performing analysis. The Analysis Manager may work on the SUT's raw data sets produced from an executed Test Flow from the Test Manager. Various forms of output may be generated, such as Report 536 in the form of Analysis Reports 340 and Plots 338 in the form of Analysis Plots 342. Other types of reports and plots may be implemented.

Figure 4:
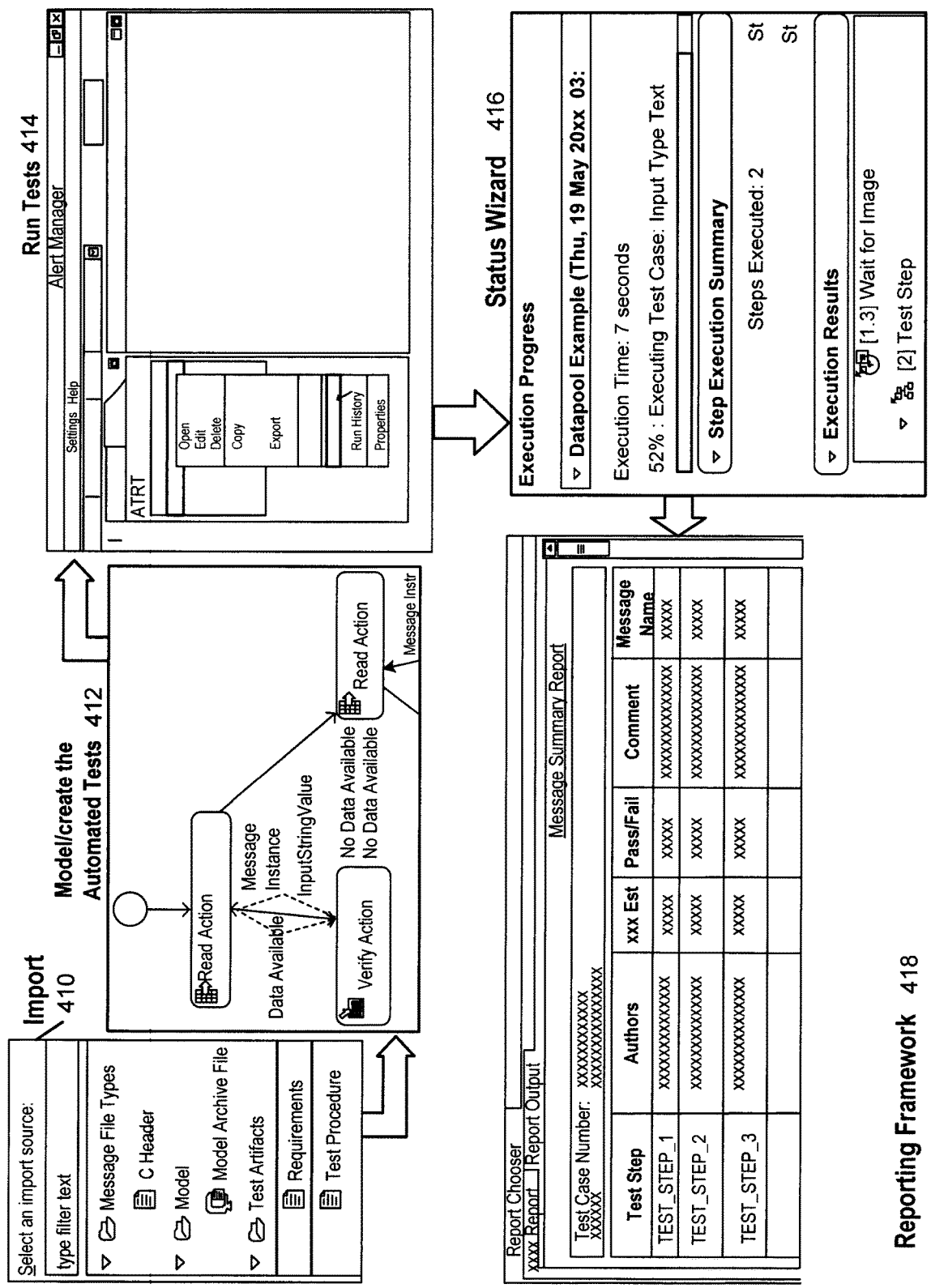
FIG. 4 is an exemplary diagram illustrating an automated test and re-test system, according to an embodiment of the present invention.

FIG. 4 is an exemplary diagram illustrating operation of an ATRT system, according to an embodiment of the present invention. Input data may be selected and imported, as shown by 410, to a System Model to create automated tests, as shown by 412. As shown by 412, test flows may be created by using an interactive user interface. Test flows may be executed on the SUT, as illustrated by 414. A status interface provides details concerning the execution progress, as shown by 416. Analysis data may be then be reported, as shown by Reporting Framework 418.

Figure 5:
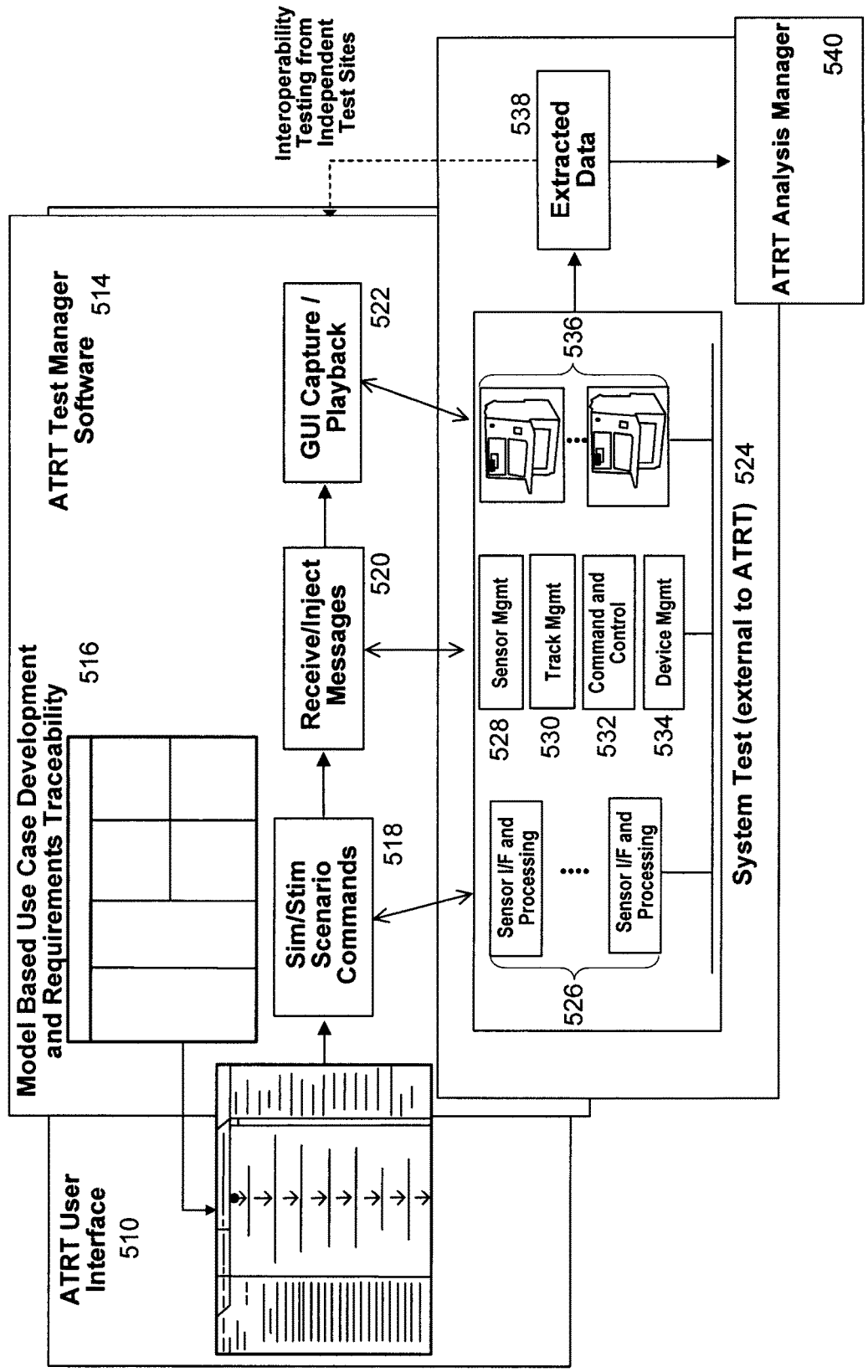
FIG. 5 is an exemplary process diagram for Test Manager, according to an embodiment of the present invention.

FIG. 5 is an exemplary process diagram for Test Manager, according to an embodiment of the present invention. Test Manager Software 514 may communicate to a user, via a User Interface 510. Test Manager Software 514 may provide various management functionality, including use case development and requirements traceability, as shown by 516. To track progress, a Requirements Traceability Matrix (RTM) may be provided that allows for traceability of test artifacts back to the requirements. An embodiment of the present invention also provides for automated capture using x, y coordinates. For quick and easy automated test creating and for SUT's whose GUI image positions rarely change, an automated capture feature based on x, y coordinates may be provided. Test Manager Software 514 may also receive scenario commands at 518, receive and inject messages at 520 and perform capture and playback at 522. System Test which may be external to ATRT is shown by 524. In this example, System Test performs processing and management functionality, as shown by senor and processing modules 526, sensor management module 528, track management module 530, command and control module 532 and devices management module 534. The System Test may also invoke various devices, as illustrated by 536. As the tests are being performed, data may be extracted at 538, which may then be used to perform analysis by Analysis Manager 540. Analysis may include data management, event reconstruction, requirements verification, performance analysis and various types of test reports.

Figure 6:
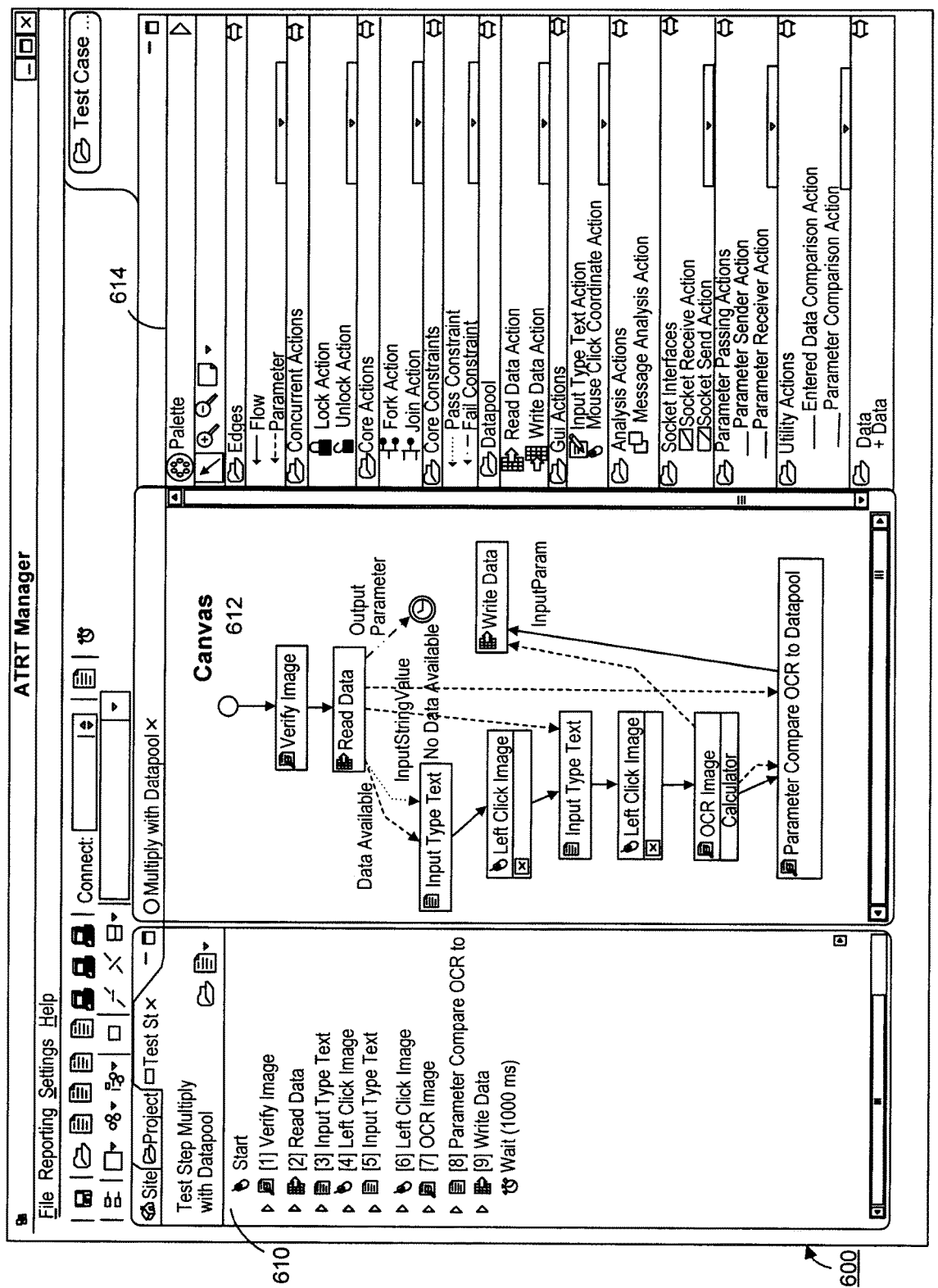
FIG. 6 is an exemplary illustration of a canvas provided by Test Manager, according to an embodiment of the present invention.

FIG. 6 is an exemplary illustration of a canvas provided by Test Manager, according to an embodiment of the present invention. A canvas provides a user interface for building test flows. Interface 600 may include several panels, including Panel 610 which provides test steps, including verify image, read data, input type text, left click image, OCR image, parameter compare, write, data, wait, and other steps. Canvas 612 illustrates test flows, which may include a collection of test steps or actions. Panel 614 provides various actions, including concurrent actions, core actions, core constraints, data pool, GUI actions, analysis actions, socket interfaces, parameter passing actions, utility actions, etc. Also, functions and edges that indicate the order of test execution may be specified.

Figure 7:
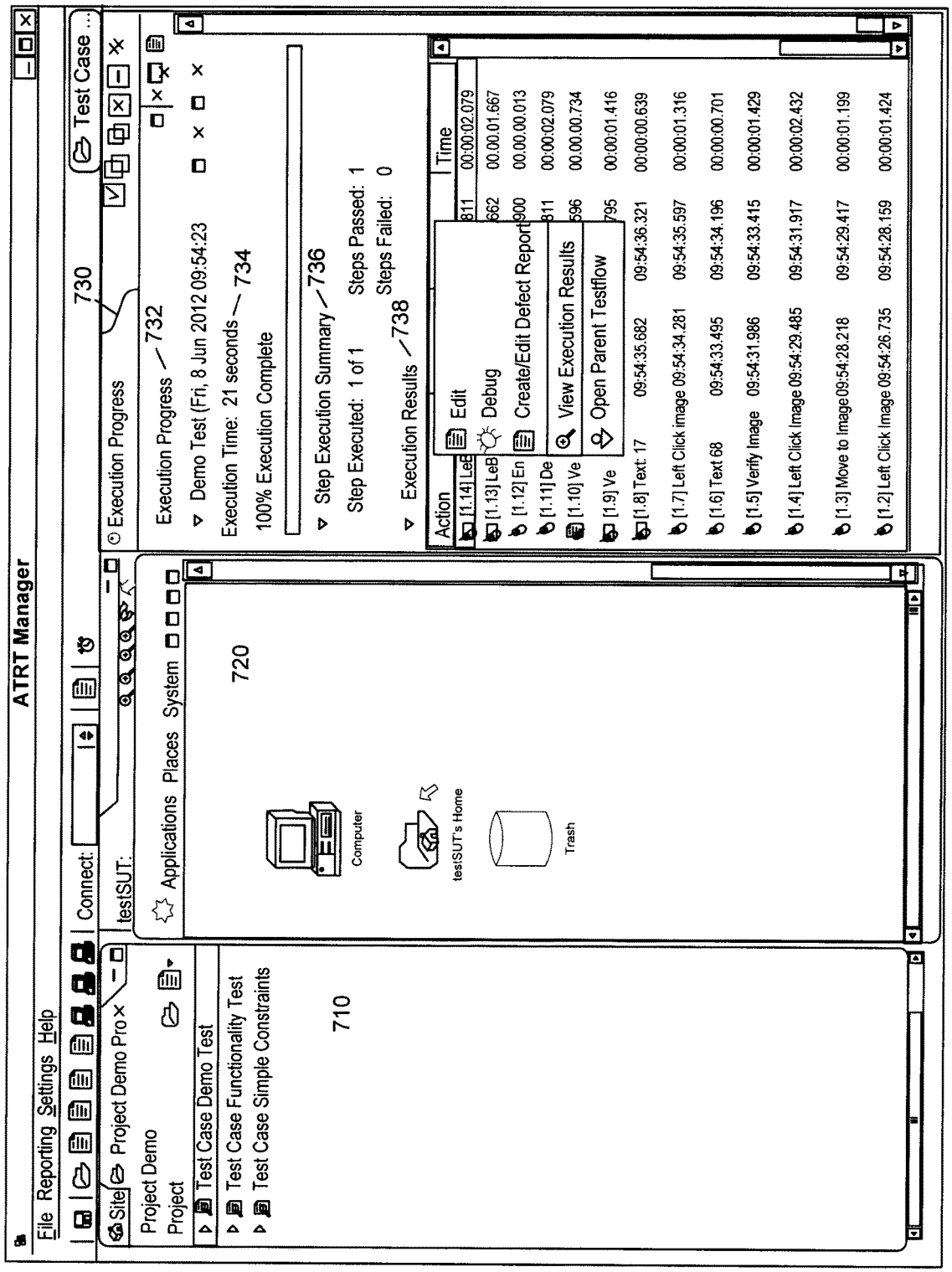
FIG. 7 is an exemplary illustration of a capturing and executing process provided by Test Manager, according to an embodiment of the present invention.

FIG. 7 is an exemplary illustration of a capturing and executing process provided by Test Manager, according to an embodiment of the present invention. Panel 710 provides a list of projects, tests, constraints, etc. Panel 720 represents a System Under Test. Panel 730 illustrates details of execution progress 732. For example, execution time 734, execution summary 736 and execution results 738 may be displayed.

Figure 8:
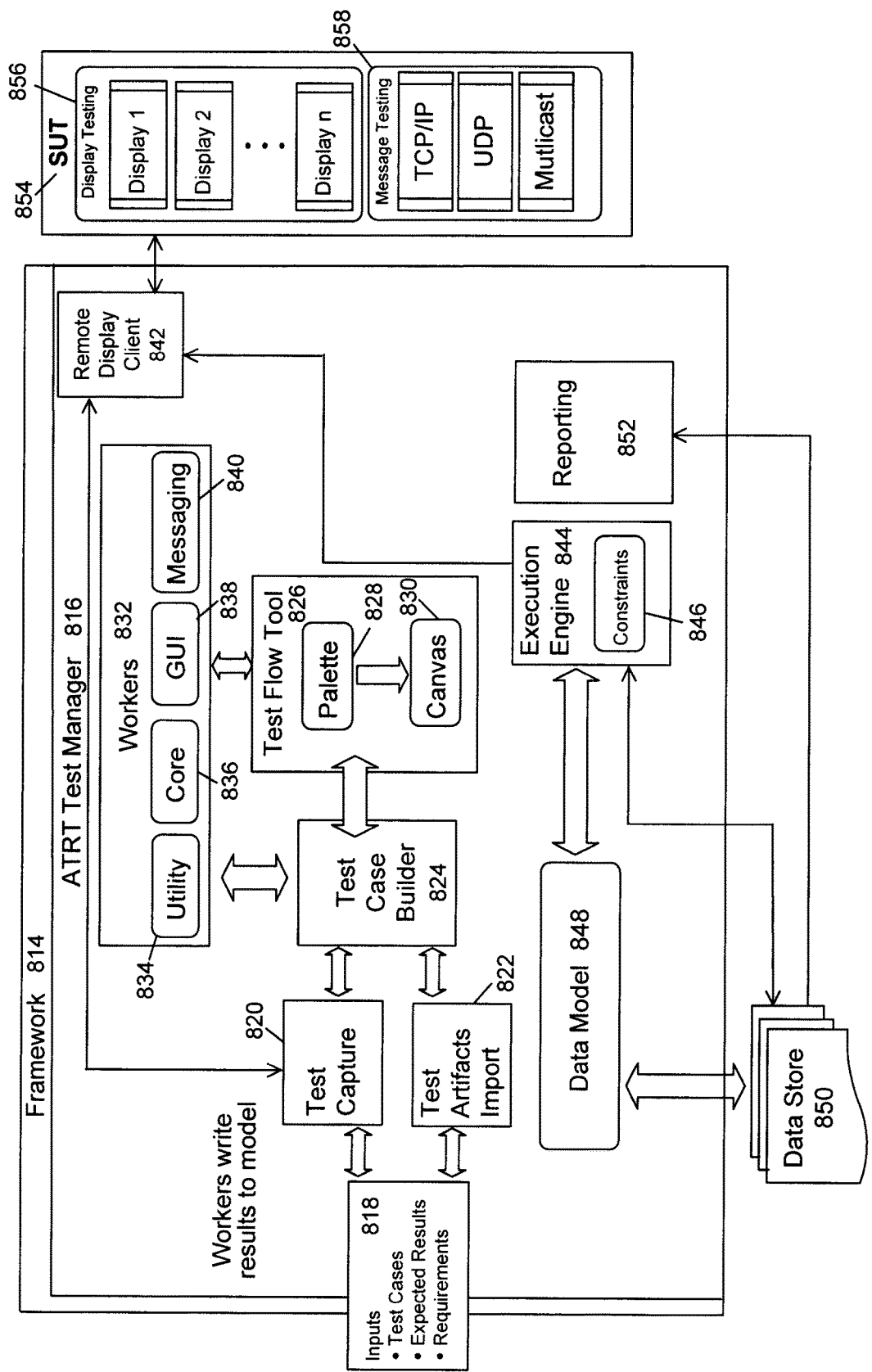
FIG. 8 is an exemplary diagram of a system software architecture for Test Manager, according to an embodiment of the present invention.

FIG. 8 is an exemplary diagram of a system software architecture for Test Manager, according to an embodiment of the present invention. Test Manager provides an automated software testing capability including a testing framework, automation engine and reporting features. It may be introduced at any phase of a program, utilize existing interfaces and documentation (e.g., requirements, test cases, interface documents, and software design documents), and applied to as much or as little of the testing program as desired. The automated testing capability provided with the Test Manager may provide a substantial reduction in the cost, time, and resources associated with traditional Test and Evaluation methods and processes for software intensive systems.

FIG. 8 illustrates how Test Manager 816 may interact with the System Under Test (SUT) 854. An embodiment of the present invention may use a framework, as shown by 814, with extensible functionality provided through plug-ins, as opposed to functionality that is hard coded. Users may extend UI aspects (e.g., layout, menus, toolbars, etc.) as well as functionality. Test Manager software architecture includes project specific and project independent components. These components may be built using an open development platform. Project independent components may include test case builder 824, reporting feature 852, and capture/playback engines. Project specific components may include test case setup, specific sender/receiver algorithm, and project specific plug-ins.

Test Manager 816 may include a common framework including reusable software services plug-ins. It may be built on a foundation that provides a modular development approach across a variety of platforms and languages. Test Manager architecture requirements include support for a variety of functionality, including applications running on multiple computers, applications developed in different languages, applications running on different operating systems, applications which use different types of network protocols such as TCP/IP, NDDS, UDP etc., integration of multiple commercial testing tools from different vendors and testing without having to install the Test Manager on the same computers as the Application Under Test (AUT).

An embodiment of the present invention may be cross-platform and cross-Operating System (OS) compatible. Many organizations are responsible for testing SUTs that run on various platforms across various Operating Systems. Instead of having to rely on purchasing different tools to be compatible with the different environments, Test Manager is cross-platform and cross OS compatible.

An embodiment of the present invention may also be GUI technology neutral and thus independent of any GUI controls (e.g., custom or non-custom). This addresses the issue with new GUI controls being developed constantly and testing tool vendors having a difficult time maintaining tool compatibility. Also, test data artifacts may be stored in XML format, which allows for industry standard cross-compatible data exchange and data representation.

Inputs, as shown by 818, may be received at Test Capture 820 and artifacts may be received at Test Artifacts Import 822. Inputs 818 may include test cases, expected results, requirements and/or other data. Test Case Builder 824 may then use the input information to generate test flows, using Test Flow Tool 826. Workers 832 may be in communication with Test Case Builder 824 and Test Flow Tool 826. Workers 832 may include functionality, such as Utility 834, Core 836, GUI 838 and Messaging 840. Remote Display client 842 may serve as an interface between SUT 854 and Test Capture 820. SUT provides Display Testing 856 and Messaging Testing 858. Multiple displays may be managed and tested by Display Testing 856. Multiple protocols may be supported by Messaging Testing 858. Execution Engine 844 may communicate with Remote Display client 842 and Data Model 848.

Test Manager 816 may interface with services on a SUT, as shown by 854. Such services may include those that may be performed more effectively through a non display-based testing approach. Data may be exchanged with an instance of Test Manager via a web service interface. Remote display technology allows Test Manager's installation to be non-intrusive to the System under Test (SUT), e.g., it does not modify the SUT configuration, which is often a prerequisite to testing of large commercial software systems. An embodiment of the present invention may connect to a different SUT component at the sub-step level. When a test sub-step requires a change in connection to a different SUT component, an IP address/connection feature allows a test sub-step to be modified and connected at the most granular level, e.g., the test sub-step level. Reporting functionality is available at 852, where reports and/or other data maybe stored in Data Store 850.

According to an embodiment of the present invention, Test Flow Modeling Tool 826 allows users to build models that represent a desired behavior of the test case during execution. Models built through the Test Flow Modeling Tool 826 may be referred to as Test Flows, and may be used by the execution engine to determine where and when to perform specific units of work. Test Flow Modeling Tool 826 may provide modeling capability by using its core components: canvas 830 and palette 828. Canvas 830 provides the workspace on which the user may construct models to represent execution flow. Palette 828 may contain collections of modeling components that serve as building blocks for the canvas. Components may be added from palette 828 to canvas 830 and arranged by the user to dictate the desired behavior of the test. Test Flow Modeling Tool 826 may use a modular and extensible approach, where various plug-ins may contribute additional components to the palette using APIs.

Execution Engine 844 may be responsible for the execution of a Test Flow as defined in the Test Flow model. The test execution may be heterogeneous in that it supports different types of functional units, called workers shown by 832, such as capture/playback testing or message testing 840. In addition to the test execution, Execution Engine 844 may provide an extension point to allow workers to provide specific execution environments that may be initiated and shutdown during the test execution. Execution Engine 844 may also provide extension points for executable constraints, as shown by 846, that may be added to a test execution. These constraints may be used to provide some level of test execution control at the user level. The constraints may also provide the ability to supply alternate paths of execution. A constraint, shown by 846, may be defined as a unit of work that abides by an Execution Engine interface specification for flow evaluation control. A constraint may be responsible for evaluating a path of execution to determine whether or not the path should be traversed.

An action may include a unit of work that may be added to a Test Flow model. A worker may be an implementation of a corresponding action that abides by an Execution Engine interface specification for job control. Execution Engine 844 may be responsible for managing execution of workers of specific types. The workers and the execution environments may be developed independently, or external to the Execution Engine 844, and pluggable into an Execution Engine framework.

Execution Engine 844 may execute parallel Test Flows through the use of fork, join and/or other actions. A parallel Test Flow may include an execution path that diverges within a single instance of the execution engine, and then converges either at a user created join action, or at the implicit join that occurs at the end of each distinct Test Flow. Execution engine 844 may also execute Test Flows concurrently. This may be accomplished when the user executes separate Test Flows in their own instance of Execution Engine 844. These instances may be completely independent of one another in the context of execution.

Workers 832 may be developed to carry out Test Manager automation. As new requirements may be identified, new workers may be developed and added to Framework 814. This allows for easy customization of Test Manager to meet various customer needs and preferences. According to an exemplary embodiment, workers available for test case modeling may include Core Workers 836, Utility Workers 834, GUI Workers 838 and Messaging Workers 840. Other functionality may be provided as well.

Core Workers 836 may perform actions available with any type of test case flow. Core actions may affect the flow of execution. Some examples include: Start Action which indicates the start of a Test Flow; Fork Action which may be used to fork multiple flow paths for parallel execution; Join Action which may join multiple Test Flow paths (e.g., if the test requires that multiple Test Flow paths finish before continuing, the user would use the join to make sure that the Test Flow paths complete before moving to next action); Wait Action which may be used to wait for a specified amount of time before further execution; and Manual Action which may prompt the user to perform an action before moving on (e.g., instructions for the manual action may be presented to the user).

Utility Workers 834 may perform data manipulation or other system functions. These actions may support and/or evaluate the results of other actions. For example, "Entered Data Comparison Action" may perform a comparison of a parameter to a value specified by the user. Comparison evaluation options may be dependent on the data type of the parameter. Exemplary comparisons may include: Numeric (e.g., equal to, not equal to, greater than, less than, greater than or equal to, less than or equal to, within inclusive range of); String (e.g., equal to, not equal to); and Boolean (e.g., true, false). "Parameter Comparison Action" may perform data comparisons of two or more parameters. Comparison evaluation options may be dependent on the data type of the parameter. Exemplary comparisons may include: Numeric (e.g., equal to, not equal to, greater than, less than, greater than or equal to, less than or equal to); String (e.g., equal to, not equal to); and Boolean (e.g., equal to, not equal to, logical and, logical or). "Regular Expression Comparison" may compare a testable input string with a regular expression contained in another input string. Another example, may include "String Manipulation Action" which may provide the capability to perform string manipulations on a string parameter. Action produces the manipulation as an output parameter. Manipulation actions may include Transform—including regular expressions transformations; Sub String—creates a substring of this string using user defined start and end indices; To Lowercase—converts all of the characters in this string to lower case; To Uppercase—converts all of the characters in this string to upper case; Trim—omits leading and trailing whitespace from a string. "System Command Action" may allow users to specify commands which may be passed to the system during execution. Examples may include executing a shell script to perform some function. "Range Comparison Action" may include evaluating if a given input parameter lies within a user specified range. "Data Type Conversion Action" may provide the capability to convert an input parameter into any number of supported data types. For example, if a user sets the output parameter type to be equal to the type of the input, no conversion will take place. For the allowed conversions, an output may be a parameter of the new data type.

GUI Workers 838 may perform interactions with the display of a SUT. Some examples may include Mouse Click Coordinate Action which involves a mouse action at a specified (x,y) coordinate; Mouse Click Image Action which involves a mouse action on a specific image; Anchor Image Action may involve a mouse click on an image found in a specified area of the display or verify that an image appears in this specified area of the display; Move Mouse to Coordinate Action may allow users to specify an (x,y) coordinate on the screen to move the mouse cursor to; Move Mouse to Image Action may allow users to specify an image on the screen to move the mouse cursor to; OCR Action may capture an image from the screen and use an Optical Character Recognition engine to convert it to a text string; Type Text Action may provide the user the capability to enter text that the user would enter in through the keyboard; Input Type Text Action may provide similar functionality to the type text action, but outputs a text string obtained from an incoming parameter edge rather than user entered text; Verify Image Action may provide the capability to verify that an image is found on the display; Wait for Image Action may provide the capability to wait for an image to appear on the display; and Mouse Wheel Action may capture middle mouse scroll wheel actions.

Within the GUI workers, shown by 838, an Image Target Viewer may be available for any action that uses an image. The user may view a snapshot of the screen at the time the image was captured into the action. The Image Target Viewer may allow the user to access a variety of information about the image associated with the particular action. As new types of image-based actions are added, the image target viewer framework may be extended to accommodate additional information to accurately represent the targets of those actions.

Messaging Workers 840 may communicate with the SUT via a Message Testing Module as shown by 858. Messages may include any message in any form from one device to another device via a network connection. Messages may include text, images, audio, video and/or other form of data, as well as various combination of the foregoing. Test Manager 130 may record Test Flows and playback back graphically at a later time. This may include capturing and analyzing send/receive messages that drive the SUT. For example, messages may be recorded and processed through Test Manager during the test to record and analyze the messages before a different subscriber system receives the messages. Messages may include sending and receiving scenario control messages; simulation control messages; heartbeat/health messages, for example.

Remote Display client 842 may represent a collection of various plug-ins that work together to enable users to view and/or control a SUT, shown by 854, over a network. Remote Display client 853 may be designed so that access to a Remote Display connection may be managed through a connection handle. This allows multiple threads to share a connection. Each handle may be set to be read only separately. In addition, a handle owner may request that it be the only one with write access, for example. The handles may catch attempts to send key/mouse events before the connection is established or during a reconnect, and may wait a configurable amount of time with a configurable number of retires for the connection to establish before continuing. Remote Display client 842 may be designed to be independent of the overall System and may be used separately from the Test Manager.

A Record/Playback feature may allow the user to record a Remote Display session and subsequently play it back while performing test capture. The screenshots may be taken directly from the user activity on the SUT (e.g., user actions are not recorded via Test Manager client interface as they are during automated testing efforts, instead a user may directly interact with the SUT machine and screenshots may be recorded by the Test Manager client). The SUT recording may be stored for retrieval on the Test Manager client machine.

Reporting 852 may manage results and data pertaining to test case execution and may also display the results. Reporting 852 may present results of test case executions to the user in various levels of detail, from high-level summaries to action-by-action execution status reports. Reporting 852 also provides for execution-independent reports for various details of test cases. Formatting of reports may be based on custom templates, providing the reporting plug-in with the ability to display easily different formats in the future. In addition to generating and viewing reports within Test Manager, the Reporting plug-in provides support to export reports into other tools, including Microsoft Excel, HTML, Adobe PDF, and Microsoft Word.

Exemplary execution-specific reports may include: Actions Executed Report—provides an action-by-action detailed report of the execution run, including notes generated by the Execution Engine about action results; Post Execution Requirements—provides requirements traceability information by detailing the status of requirements that have been linked to an executed test case; Post Execution Summary—presents a summary of each test step's execution within the test case.

Execution-independent reports may include: Test Case Detailed Overview—displays a line-by-line report of all test steps and actions within a test case, along with any associated requirements and comments; Test Case Pre-Execution Requirements—summarizes all requirements linked to a test case and displays associated test steps; Test Case Summary Overview—provides an overview of each test step within a selected test case, listing expected results and requirements; Test Case Pre-Test—a combination of both Test Case Pre-Execution Requirements and Test Case Summary Overview reports.

Data Model 848 may provide the interfaces for storing and retrieving data used by Test Manager. One function may include abstracting details of how this data is persisted so that Test Manager may access data without being directly dependent on the specific persistence mechanisms or backing data stores. This abstraction may allow improvements or changes to persistence implementations without requiring modification to Test Manager. Data Model 848 may also enforce how the data may be organized, so that any semantics designed within the data model may be actively enforced. In addition to providing the support necessary to the core Test Manager application, Data Model 848 may also provide functionality to enable Test Flow workers to extend the model as desired.

Figure 9:
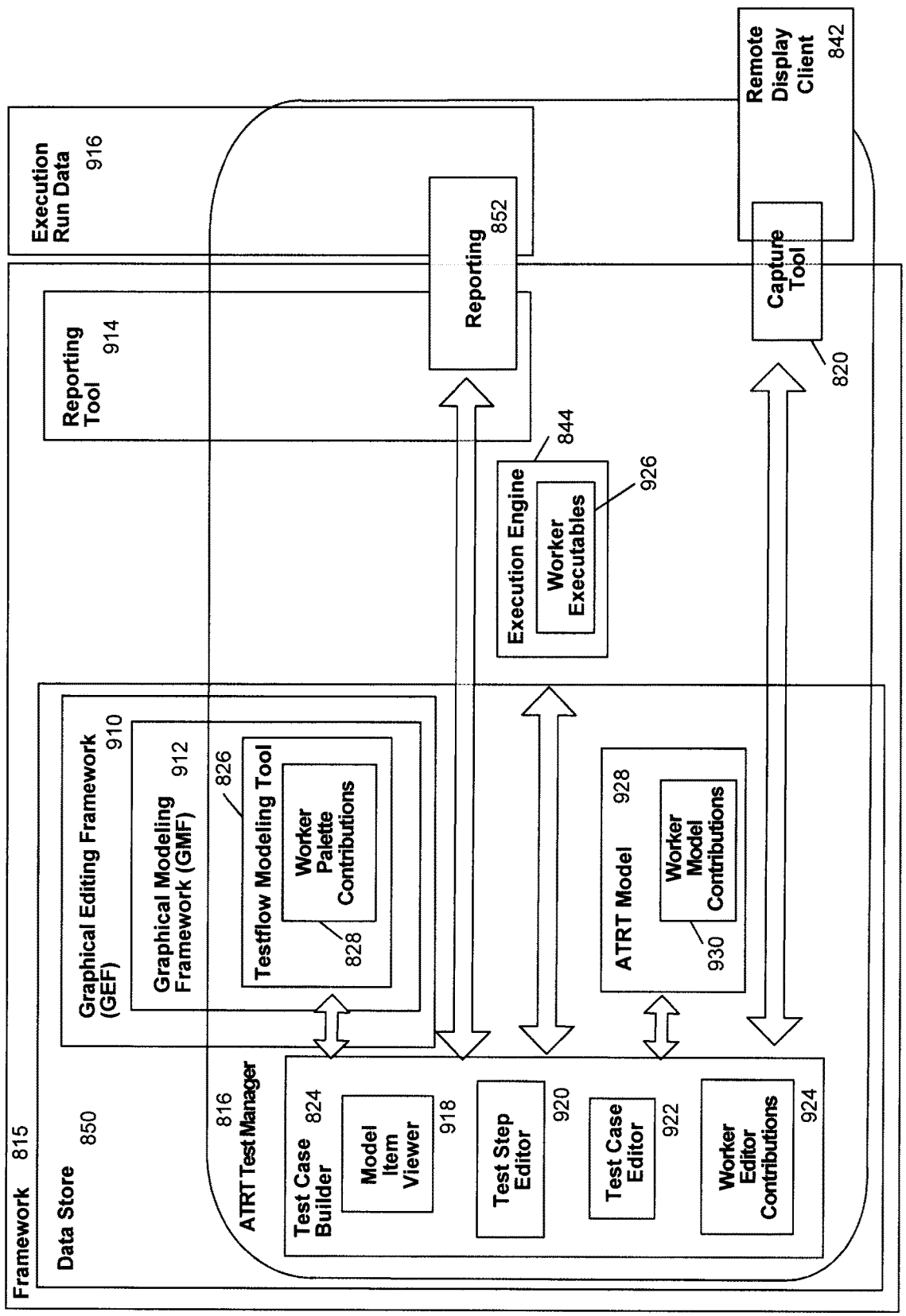
FIG. 9 is an exemplary Test Manager software design diagram, according to an embodiment of the present invention.

FIG. 9 is an exemplary Test Manager software design diagram, according to an embodiment of the present invention. FIG. 9 illustrates Test Manager and its functional areas. Test Manager allows the user to create, update, modify, and delete test data (e.g., test cases, test steps, etc.). Test Manager may provide an interface to connect to a SUT (System Under Test) and may further allows users to automate (e.g., capture and execute) display tests. Users may also monitor test case execution. Once execution is complete, users may view and print execution reports.

Test Manager may be built upon a framework and makes use of a component-based architecture to provide the application's functionality. Each functional area of the application may include one or more components and/or plug-ins. This architecture allows additional components to add or extend existing capabilities more easily within the application.

Data Store 850 may interact with Graphical Editing Framework 910 and Graphical Modeling Framework 912. Through Test Manager 816, Data Store 850 may interact with Reporting Tool 914, Execution Run Data 916 and Remote Display client 842. Reporting Tool integration allows for a flexible and extensible reporting framework. Users may design custom reports that may include an export capability to various reporting formats (e.g., pdf, Word, html, etc.). Within Test Manager 816, Test Case Builder 824 may interact with various other components, including Test Flow Modeling Tool 826, Reporting 852, Execution Engine 844, ATRT model 928 and Capture Tool 820. Test Case Builder 824 may include additional components, including Model Item Viewer 918, Test Step Editor 920, Test Case Editor 922 and Worker Editor Contributions 924. Test Flow Modeling Tool 826 may include Worker Palette Contributions 828. Reporting 852 may use Execution Run Data 916 and may use Reporting Tool 914 in generating various forms of reporting. Execution Engine 844 may include Worker Executables 926. ATRT Model 928 may include Worker Model Contributions 930. Capture Tool 820 may capture data from Remote Display client 842.

Figure 10:
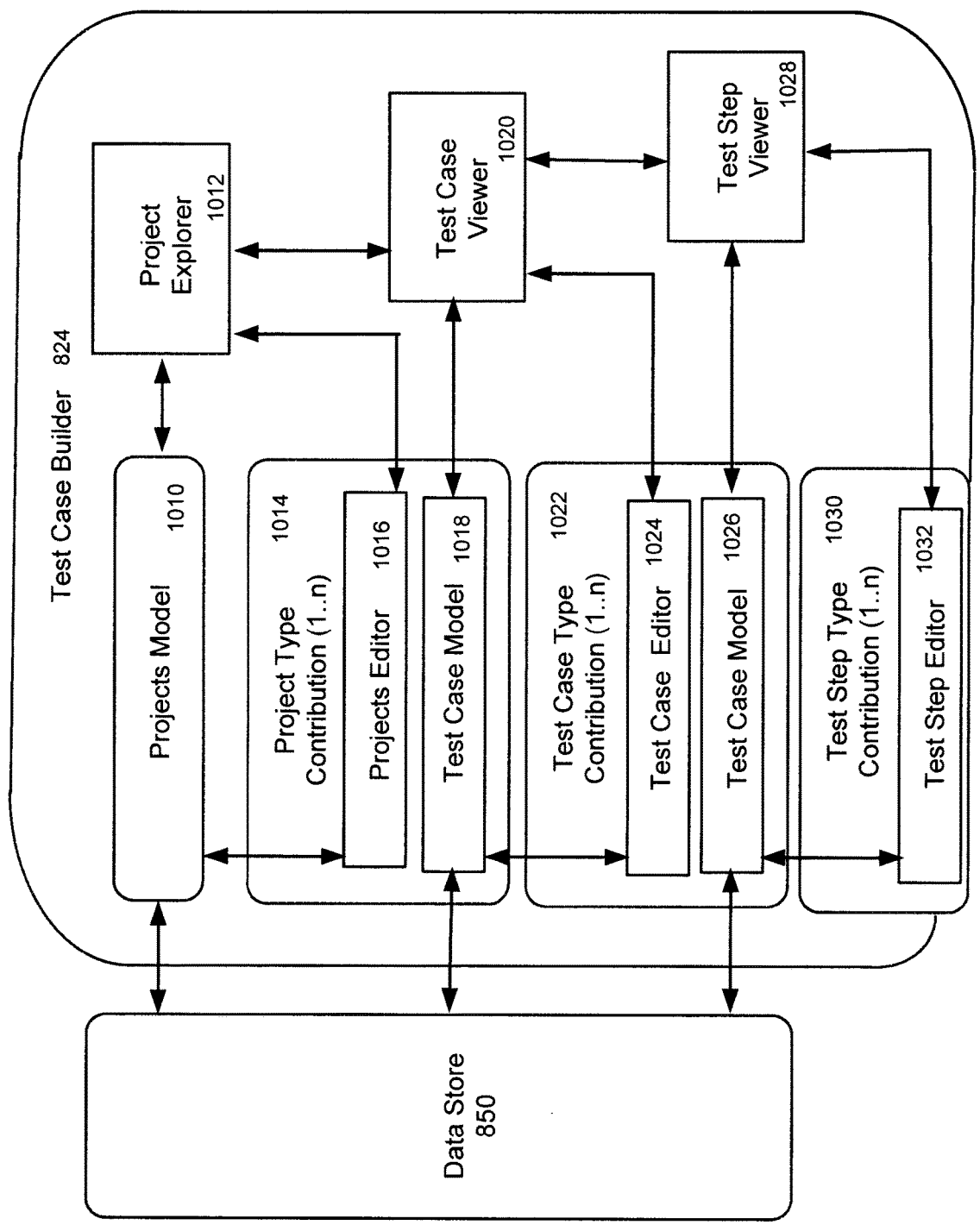
FIG. 10 is an exemplary illustration of a Test Case Builder, according to an embodiment of the present invention.

FIG. 10 is an exemplary illustration of a Test Case Builder, according to an embodiment of the present invention. Test Case Builder 824 may provide common functionality for creating and editing test cases and their respective test steps. Test Case Builder 824 may provide a mechanism for new test step types to be contributed independently, allowing for future expansion of the types of test cases that can be designed. For example, Test Case Builder 824 may supports Message and GUI based test steps. As shown in FIG. 10, Test Case Builder 824 may include Projects module 1010, Project Explorer 1012, Test Case Viewer 1020, Test Step Viewer 1028. Depending on the complexity of the software being tested, various project type contributions 1014, test case type contributions 1022 and test step type contributions 1030 may be implemented. Project Type Contribution 1014 may include Project Editor 1016 and Test Case Module 1018. Test Case Type Contribution 1022 may include Test Case Editor 1024 and Test Step Model 1026. Test Step Type Contribution 1030 may include Test Step Editor 1032.

Figure 11:
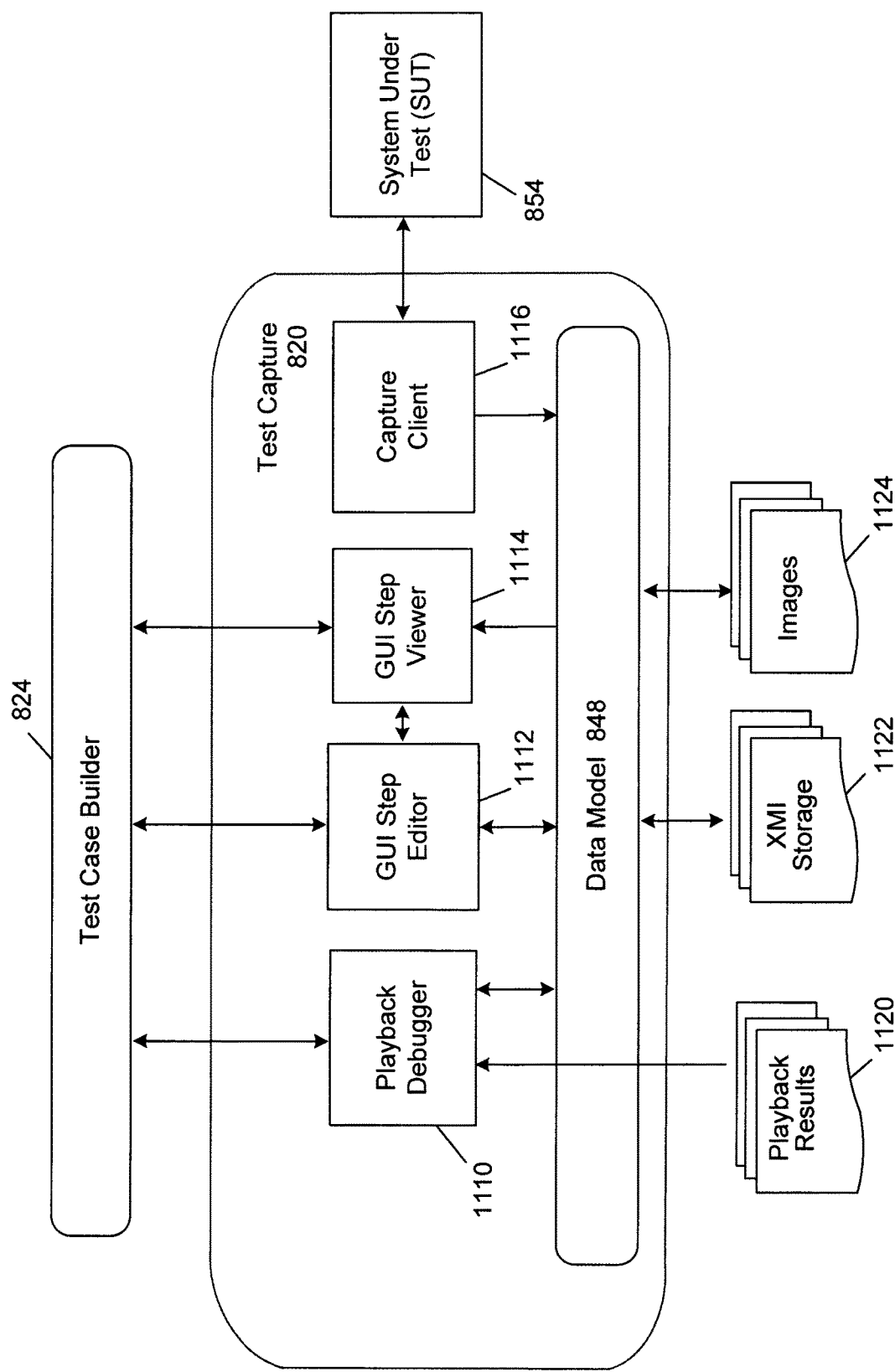
FIG. 11 is an exemplary illustration of a Test Capture Tool, according to an embodiment of the present invention.

FIG. 11 is an exemplary illustration of a Test Capture Tool, according to an embodiment of the present invention. Test Capture Tool may allow the user to create GUI test cases and test steps by associating mouse actions with images and/or (x,y) coordinates captured from the System Under Test (SUT) and to store these actions within a test step. As shown in FIG. 11, Test Capture 820 may include Playback Debugger 1110, GUI Step Editor 1112, GUI Step Viewer 1114 and Capture Client 1116. Capture Client 1116 may interact with SUT 854 and with GUI Data Model 848, which may in turn communicate with the various blocks of Test Capture 820 as well as XMI Storage 1122 and Images 1124. Playback Debugger 1110 may interact with Playback Results 1120. Test Case Builder 824 may interact with the various blocks of Test Capture 820.

Figure 12:
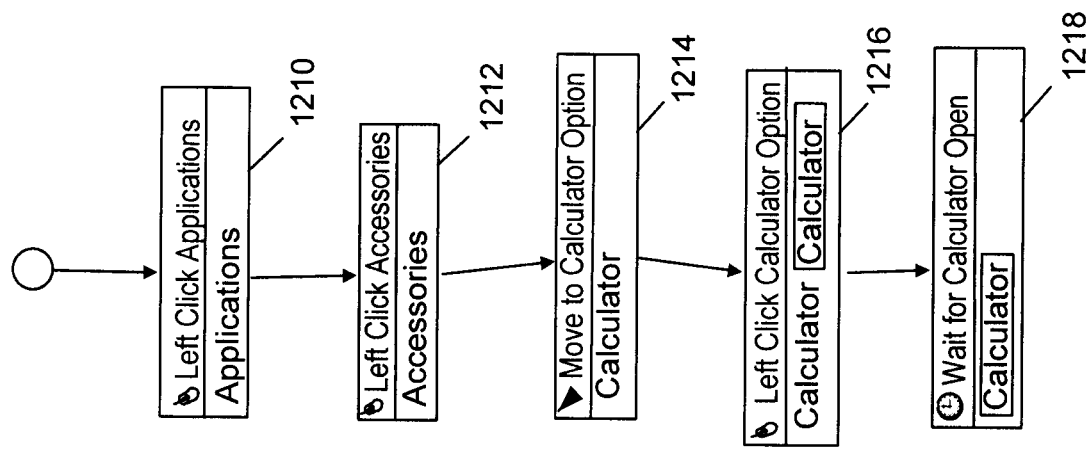
FIG. 12 is an exemplary simple linear flow, according to an embodiment of the present invention.
Figure 13:
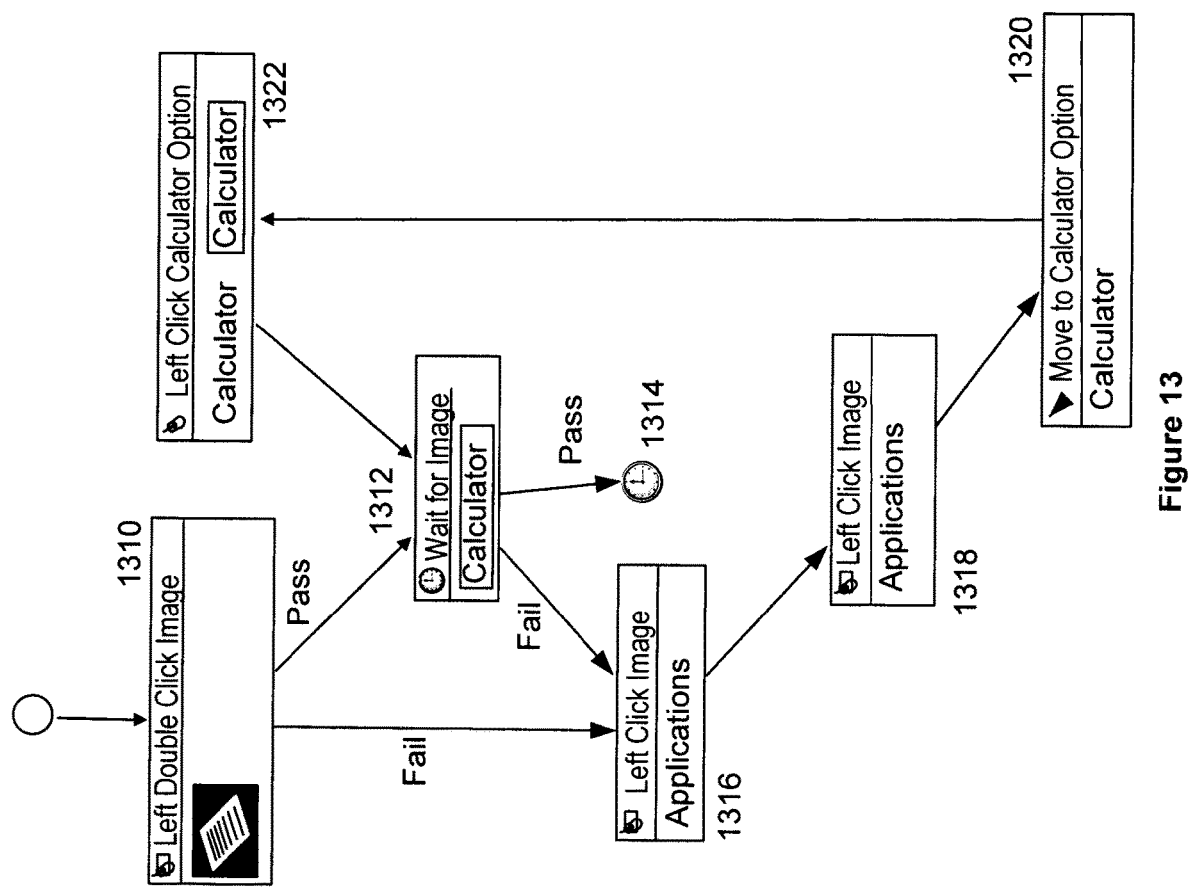
FIG. 13 is an exemplary complex flow, according to an embodiment of the present invention.

FIG. 12 is an exemplary simple linear flow, according to an embodiment of the present invention. The linear flow starts at step 1210 and proceeds to 1218 in a linear manner. FIG. 13 is an exemplary complex flow, according to an embodiment of the present invention. The complex flow illustrated starts at 1310 and proceeds through a series of pass/fail inquiries in a continuous loop. According to an embodiment of the present invention, a "test flow" may be defined as a series of time ordered steps by which a user (or groups of users) may control the system under test to exercise a specified Scenario.

According to an exemplary embodiment, there may be two types of use cases which model the expected behaviors of a SUT; Main Use Cases and Functional Use Cases. A Main use case may verify combat system set-up parameters such as doctrine, policy, area, search doctrine, etc. Functional Use Cases may be dependent on Main Use Cases and only get exercised if their dependant Main Use Case qualifies. "Functional use cases" may be described by System Modeling Language, these Use Cases may describe functional behavior (e.g., Search, Track, etc.) of the system under test as well as how the system requirements may be related to that behavior. Groups of functional Use Cases may describe a full Scenario. Examples of Functional Use Cases may include search, track, characterization, discrimination, and kill evaluation. A "scenario" may be a tactical situation presented to the System Under Test (SUT) in order to test specific behavioral paths through the system. This may be thought of as a type of engagement, specific search doctrine tasking, etc. A "test procedure" may be the full description of a system test which includes the Test Flow, the exercised Scenario, and Requirements. "Relationships" may be a relation between groups of requirements and Test Procedures. From this environment, the Test Flow may be automatically mapped directly to a series of analysis threads. Simply put, when the system user sets up a Test Flow, the Use Cases and mapped requirements may be automatically determined from their dependencies within the System Model.

The integration and optimization of the Test Manager, which automates test conduction, with the Analysis Manager, which automates the analysis, may involve forming an integrated Test Flow in a System Model. By providing the linkage between a Test Flow and a Scenario, a user may derive fundamental test metrics such as number of requirements covered by a given Test Procedure, number of Test Procedures needed to fully test a requirement, etc. This allows for an embodiment of the present invention to link and fully characterize the Test Flows, Scenarios, and Relationships in the model.

A user may display or export any Relationship which is described by the System Model from an easy-to-use GUI. The GUI may then allow derivation of real-time, short term, or long term test plans for better requirements coverage. For example, as soon as a Test Procedure is completed, an embodiment of the present invention may provide results to allow for real-time adaptive test planning. Also, the Analysis Manager may be aware of the parameters of the exact test conducted. This may include ground truth (injected target), doctrine parameters, build information, timelines, etc. This information may allow for Analysis Manager to be automated with the user not needing to supply any input information. In addition, an embodiment of the present invention may track requirements based metrics over time (or System Builds, Baselines, etc.) since it is aware what Test Procedures were exercised and how the Scenarios performed from a requirements Pass/Fail/No-Test perspective. An embodiment of the present invention may form time dependent reports tracking performance of anything from individual requirements to full Scenarios or Test Procedures.

Test Manager may utilize Test Flows which describe a sequence of actions to perform on a System Under Test (SUT). When Test Flows are exercised, specific Use Cases may be analyzed using the extracted data. This linkage between Test Flows and Use Cases may be stored in the system model. An embodiment of the present invention is directed to injecting Test Flows from Test Manager into an operating system and inject the modeled Test Flows into Test Manager. This linkage allows for the System Model to become a central repository for the system design, requirements, analysis Use Cases and Test Flows. It is this linkage that may be utilized to form test planning and real time test execution metrics to gain efficiencies across throughout the testing spectrum.

According to an exemplary application, Test Flows in the Test Manager may be broken out by Actions, Functions and Test Steps. Actions may be specific tasks that the Test Manager performs on the SUT, which may include a right mouse click on a specified image, drag and drop, or the verification of a track number output to the screen are all basis Actions. Functions may include groups of Actions and may be typically pieces of functionality that may be commonly repeated throughout test. Function examples include injecting a target, hooking a track, initializing a subsystem, etc., which may involve many specific Test Manager basis Actions. Test Steps may roll up groups of Functions; bringing up the system from a cold start would be a Test Step which involves initializing many subsystems. Depending on the complexity of a Test Flow, some or all of these groups of Actions may be used.

Figure 14:
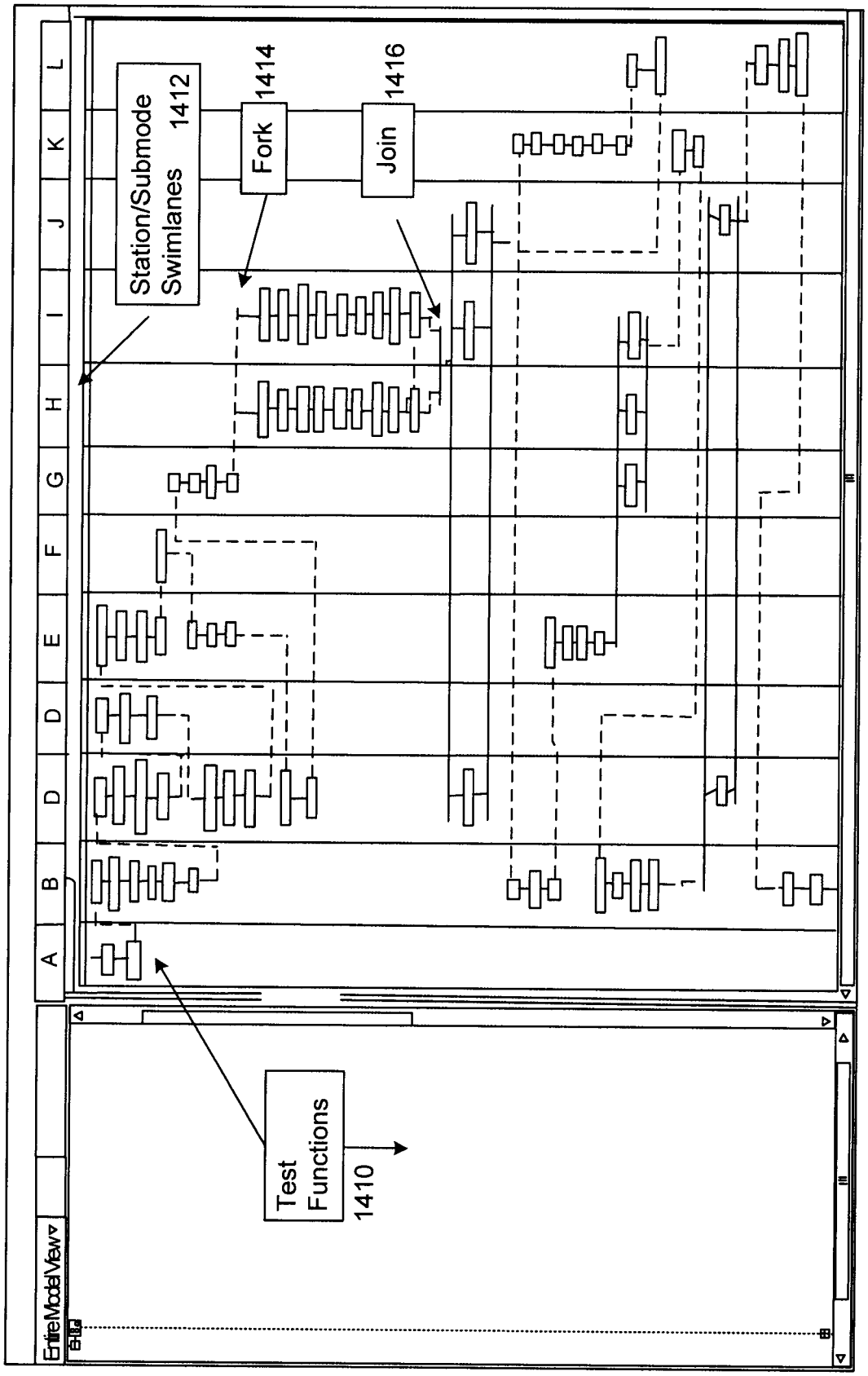
FIG. 14 is an exemplary test flow, according to an embodiment of the present invention.

FIG. 14 is an exemplary test flow, according to an embodiment of the present invention. Test Functions 1410 may represent the details of each test step in the procedure. In this example, eighty-four Test Functions were created for this procedure. Swimlanes may include a visual element that may be used to distinguish responsibilities of a process. In this exemplary architecture, swimlanes 1412 reflect various stations and submodes for conducting system testing. Actions (or call behaviors to actions) which may include fundamental use case units or steps. Swimlanes which may defines which structural component an action belongs. Blocks which may include message type between structural components (across Swim Lanes). Attributes which may include Control Flows, Object Flows, Initial Flow, Forks, Joins, Activity Final. In FIG. 14, the concept of forks and joins are illustrated. Forks 1414 and Joins 1416 are control nodes that coordinate the flow of the process. In this exemplary application, a Fork 1414 may be used to represent parallel test threads that may be tested concurrently. A Join 1416 may synchronize parallel threads back to one test thread.

Activity Diagrams illustrate how the behavioral threads may be built from a series of system activities. Activity diagrams illustrate behavior associated with a Use Case utilizing input/output (messages) and control flows. In this diagram, the swimlanes have been designed to reflect different system components. The action boxes may represent the system behavior and the object node boxes may represent internal messages.

Requirements may be linked to actions; this linking mechanism enables assessments to be made. Requirement Diagrams may represent requirements and how they are satisfied; these diagrams may have a corresponding Activity Diagram and may describe requirements dependency on Use Case behaviors. Requirements Diagrams may include: Requirements which include a capability or condition that must be satisfied; Dependencies which may include a relationship that signifies model elements require other model elements for their implementation; and Actions which may correspond to an Activity Diagram.

An embodiment of the present invention may support multiple methods of creating Test Flows to synchronize with analysis Use Cases in a system model. This may be done by allowing a user to develop Test Flows in Test Manager (e.g., through GUI capture) or by generating Test Flows in the System Model and inject them into Test Manager as executable tests.

Figure 15:
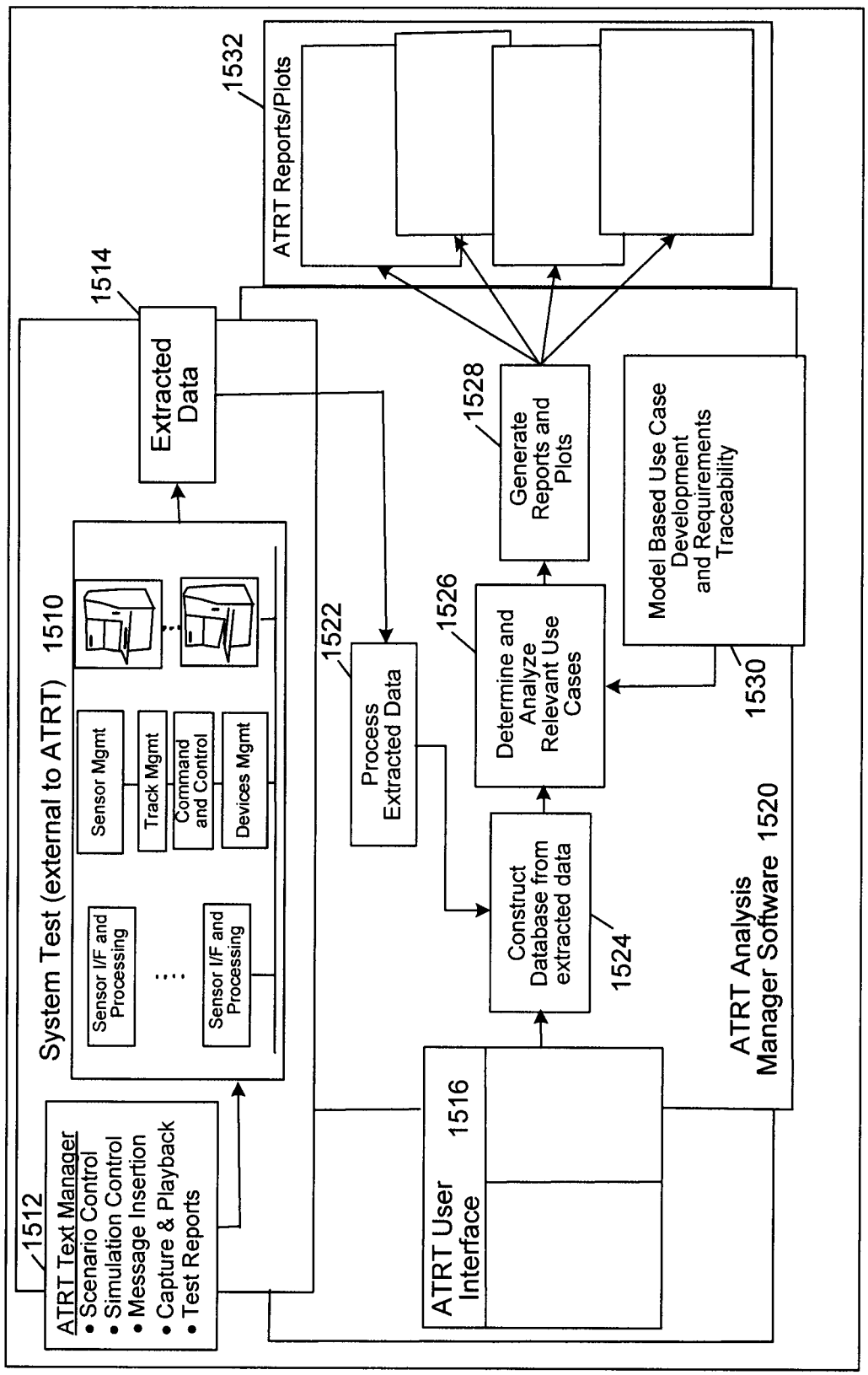
FIG. 15 is an exemplary process diagram for Analysis Manager, according to an embodiment of the present invention.

FIG. 15 is an exemplary process diagram for Analysis Manager, according to an embodiment of the present invention. Test Manager 1512 may provide various functions, including scenario control, simulation control, message insertion, capture and playback and test reports. Analysis Manager may extract data, shown by 1514, from System Test 1510. Extracted Data may then be processed by Analysis Manager at 1522. Analysis Manager Software 1520 may communicate to a user, via a User Interface 1516. Analysis Manager may then construct a database from extracted data at 1524. Relevant use cases may be determined and analyzed at 1526. Model based used case development and requirements traceability may be provided by 1530. Reports, plots and/or other output may be generated at 1528 and further displayed at 1532. Analysis may include data management, event reconstruction, requirements verification, performance analysis and various types of test reports.

Figure 16:
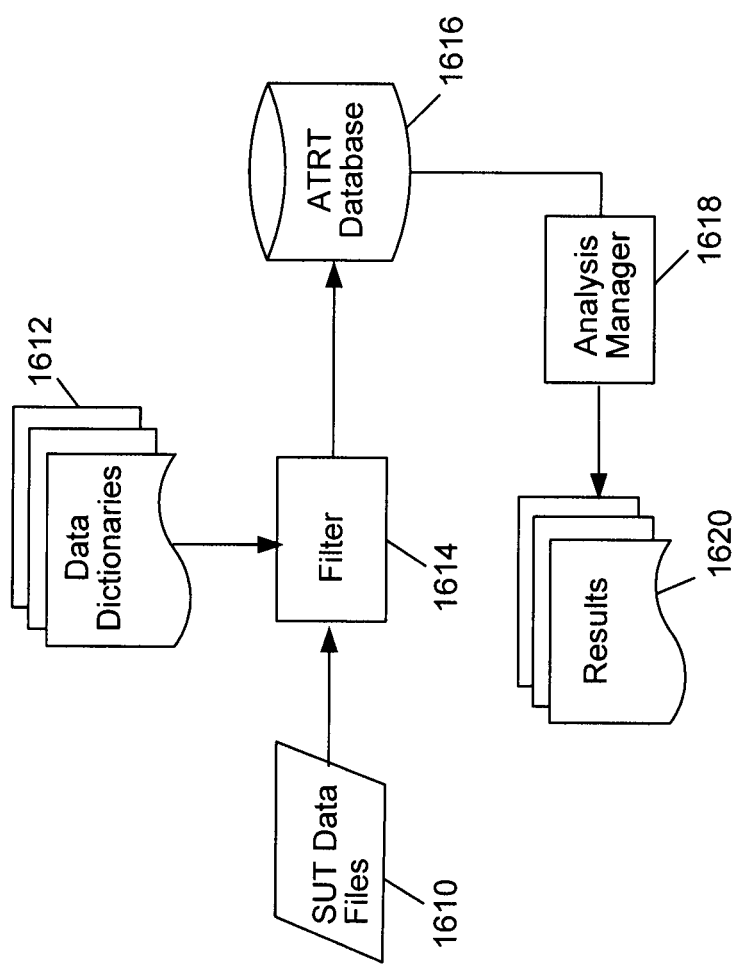
FIG. 16 is an exemplary Analysis Manger data flowchart, according to an embodiment of the present invention.

FIG. 16 is an exemplary Analysis Manger data flowchart, according to an embodiment of the present invention. Analysis Manager may assist users to pinpoint failures and/or other issues or concerns in the SUT. The exemplary flowchart depicts SUT data files 1610 that are received by Filter 1614. An exemplary format of the system data files may include raw compressed data recording format or other form of raw system data. Data dictionaries 1612 provide information on how to read and/or otherwise process the received raw data. Filter 1614 may filter the system data files using the information and/or instructions provided by Data Dictionaries 1612. Also, filter 1614 may transform the data to a predetermined format. After filtering and/or processing, the data may be stored in ATRT Database 1616. Analysis Manager 1618 may then use the data to perform its analysis and generate results, which may be displayed at 1620. Analysis Manager 1618 may provide automated analysis reports in a variety of formats that help the analyst quickly navigate large amounts of data to arrive at the specific data of interest for detailed root cause analysis.

An embodiment of the present invention is directed to Automated Test and Re-Test (ATRT) in a virtual test environment. In other words, the System Under Test may operate in a virtual environment as opposed to a native environment. A stable, scalable automated testing infrastructure of an embodiment of the present invention may extend across one or many server farms, across one or many system(s) under test (SUTs) and may work with a common set of cloud computing concepts to support a broad virtualized enterprise automated test environment.

This exemplary ATRT setup allows the use of virtualization in a specialized way to reduce the need for purchasing, storing and maintaining expensive Test Environment (TE) hardware and software. As discussed above, ATRT provides a multi-user access automated testing solution that allows users to implement and reuse ATRT, along with ATRT artifacts, such as automated test cases and other test artifacts on a provisioning basis. Additionally, related automated testing activities and processes, e.g., test cases and requirements import, requirements traceability, automated test creation and execution, and defect tracking may take place in a virtualized environment, according to an embodiment of the present invention.

Using ATRT technologies described above, reduction in test time in projects may be realized while test requirement coverage may be expanded. Moreover, combining this with hardware cost savings realized in implementing ATRT in a virtualized/cloud environment, significant savings and efficiencies may be realized. For example, twenty (20) Virtual Machines (VMs) may fit on a single server in an ATRT virtual environment. However, without VMs, twenty (20) individual servers would need to be purchased. Thus, the various features of an embodiment of the present invention allows for savings in expensive automated test equipment as well as computing and other efficiencies.

An embodiment of the present invention provides for enhanced flexibility. For example, in the ATRT virtual environment, the SUT Virtual Machine (VM) may be located anywhere on a connected network. Moreover, the SUT VM does not need to be located physically in the same VM as the ATRT VM. For example, hundreds of ATRT VMs may run in the ATRT virtual environment connecting to a limited set of SUT VMs. However, in the typical automated testing setup where a traditional testing needs to be installed on the same machine as the SUT, a 1:1 setup may be required, e.g., one Automated Testing tool for each one SUT.

A virtual machine (VM) may represent a simulation of a machine that is usually different from the target machine, that is the machine that is being simulated on. Virtual machines may be based on specifications of a hypothetical computer and/or emulate the architecture and functioning of a real world computer, or a computer that is no longer available. A virtual machine may be a software implementation of a machine, or computer, that executes programs like a physical machine. Virtual machines may include a complete system platform which supports the execution of a complete operating system. Also, virtual machines may be designed to run a single program or single process. Software running inside the virtual machine may be limited to resources and abstractions provided by the virtual machine. Virtual machines may emulate the computer environment that an application may use to execute software, programs, etc. Instead of using physical devices, one device may emulate tens or hundreds of computer environments. According to an embodiment of the present invention, the system under test may be a virtualized version of an application. Moreover, the system under test may be any number of computers or even varying types of computers.

For example, an application may be originally developed to run on a particular system with specific hardware and/or other requirements. An embodiment of the present invention may provide testing functionality through ATRT by creating an environment that emulates the particular system, with the specific hardware and/or other requirements, on a testing machine or processor. The testing machine or processor may effectively create another logical computer or environment that is running or supporting the particular system. When the application is run, executed or tested, the application may function as if it is running on the particular system, rather than on the testing machine.

Thus, an embodiment of the present invention may run a number of virtual machines on a smaller subset of servers or processors. For example, rather than maintaining 500 computers, an embodiment of the present invention may enable testing to be conducted by using just five servers. The VM software may effectively emulate the computer environment that the test application is to be run on, without experiencing any noticeable or significant differences.

An exemplary application of ATRT virtualized environment may include automatic provisioning of a virtualized automated test environment (ATRT compatible in a virtualized test environment) and automatic provisioning of the ATRT testing lifecycle for any type of system under test(s) (SUTs).

Figure 17:
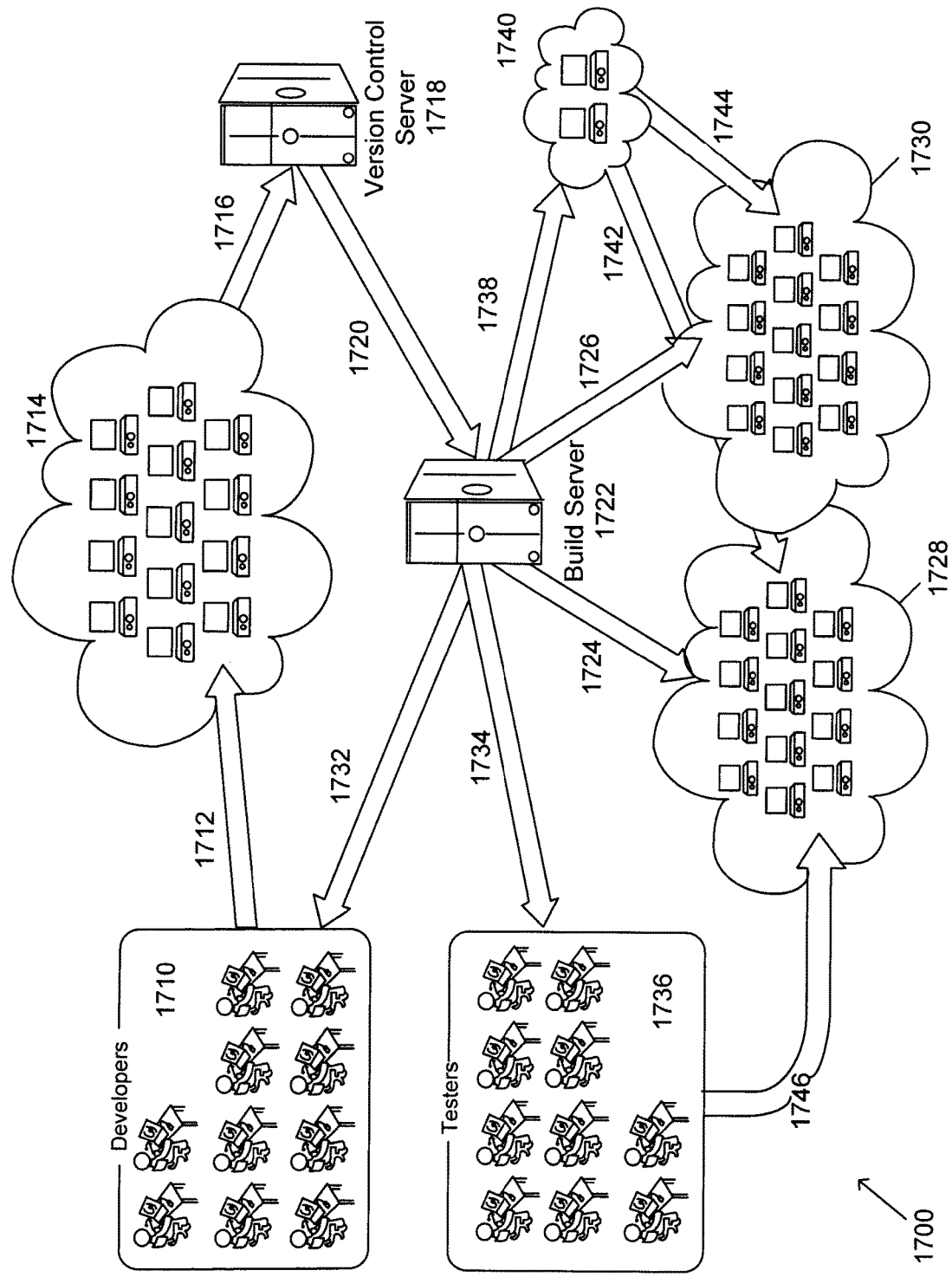
FIG. 17 is an exemplary system for automated test and re-test in a virtual test environment, according to an embodiment of the present invention.

FIG. 17 is an exemplary system for automated test and re-test in a virtual test environment, according to an embodiment of the present invention. System 1700 illustrates an exemplary development, integration and test cycle for a virtual test environment. Developers 1710 may connect to development virtual machines 1714 via a virtual network connection, as shown by 1712. Developers may be located at a single location and/or various multiple locations. Likewise, development virtual machines may be located at a single location and/or across multiple locations. Developers may update the code on the development virtual machines 1714. Developers may check in the code into Version Control Server 1718, via 1716. While a single server is shown, multiple servers may be used where the servers may be spread across various locations. Various architectures and/or other realizations may be implemented. Build Server 1722 may conduct periodic checkouts, as shown by 1720. For example, checkouts may be conducted on a nightly, periodic or other basis. Thus, automated tests may be run on a periodic basis with ATRT while in a virtual environment where the applications have been virtualized. Build Server 1722 may then compile and package a new build for deployment. As shown by 1724 and 1726, Build Server 1722 may deploy the new build to nodes, represented by 1728 and 1730. Nodes may be located at a single location as well as across multiple locations. Node 1728 may represent a set of test VMs running a particular program or application while node 1730 may represent a set of test VMs running a different program or application.

Notification of a completed build may be transmitted to Developers 1710, as shown by 1732, and to Testers 1736, as shown by 1734. As with developers, testers 1736 may be located at a single location or multiple locations, across various geographic regions. The notification may include a change log and/or other data. Also, notification to start automated periodic tests may be transmitted to Dedicated Automated Test Virtual Machines (ATRT) 1740, via 1738. Dedicated Automated Test Virtual Machines (ATRT) 1740 may start automated tests and report results to node 1728, via 1742, and node 1730, via 1744. Testers may connect to cloud virtual machines for test and verification of deployed builds, as shown by 1746. For example, testers may access node 1728, via 1746, to create and/or run automated tests.

As shown in FIG. 17, the ATRT virtualized setup allows for a stable, scalable automated testing infrastructure that may extend to one or more system under test (SUTs) and/or one or more ATRT installations. This exemplary ATRT virtualized test environment setup provides a highly scalable solution whether a user needs to run 10 or 10,000s of tests connecting to a predetermined number of SUT displays and servers over a time period, e.g., days or weeks, and whether the user needs to analyze 100s of test outcomes or 10000s or more. The ATRT technology allows for a predetermined number of concurrent tests to run or a predetermined number of serial tests, depending on the test type. The tests and test outcomes may be stored in an ATRT database/repository for access by any subscriber (or user) of the ATRT virtualized environment. A subscriber/user may be a developer, tester or any user of the program with ATRT user access privileges, including a system. Also, installation may be avoided on virtual machines because access may be performed remotely to the SUT. Testers, developers, other users may be located at various locations, with remote access. Similarly, the servers, nodes and/or other devices may be located at the same or different locations, all with remote access capability.

Typical automated testing tools may need to be installed on the System Under Test (SUT) to link to GUI coding libraries to retrieve object properties of the GUI widgets and/or pull information out of an Operating System's window manager to create an automated test baseline. As recognized by an embodiment of the present invention, installing an automated testing tool on the SUT however is not desired because the installation modifies the system environment (when the testing system environment should be identical to the production system environment). Moreover, installation does not lend itself to cloud computing because of the additional SUT installation requirements with each tool installation.

The ATRT virtualized test environment setup may support live migration of machines, load balancing, easy movement of machines to different servers without network interruption and further allows any upgraded VM to run on any server. As discussed above, ATRT may test systems independent of operating system and/or platform. Further, ATRT provides an automated testing solution that is not required to be installed on the same computer or VM as the SUT. An embodiment of the present invention is directed to communicating with the SUT via a VNC or Remote Display server, or the RDP protocol, for example, which may transmit the SUT images back to the tester to the ATRT client. According to an embodiment of the present invention, ATRT does not need to be installed on the SUT.

An embodiment of the present invention is directed to automatic provisioning of an ATRT testing lifecycle for any type of System-Under-Tests (SUTs). One or many users may access one at a time or concurrently the ATRT virtual test environment with any device, such as a laptop, mobile device, tablet, and/or any device with a computer processor, with a network connection to connect to the ATRT virtual environment.

Users may then request one or more instances of ATRT. According to an embodiment of the present invention, the automated ATRT provisioning meets a user's changing needs without the user being required to make any software modification on their end to conduct the automated test. The ATRT virtualized test environment (or the "cloud") may then spawn an instance of ATRT which then allows the user to access any automated testing artifact and execute the automated testing lifecycle. The user may then conduct any activity associated with any part of the automated testing lifecycle, e.g., create an automated test case, reuse or troubleshoot an existing automated test case created by any user, as privileges allow (e.g., privileges and access rights may be set in ATRT), import requirements, produce a requirements traceability report, and more as described in FIG. 17. The ATRT virtual test environment provides additional features and capabilities to support various processes and improve quality, such as Unit Testing and Code Coverage.

Figure 18:
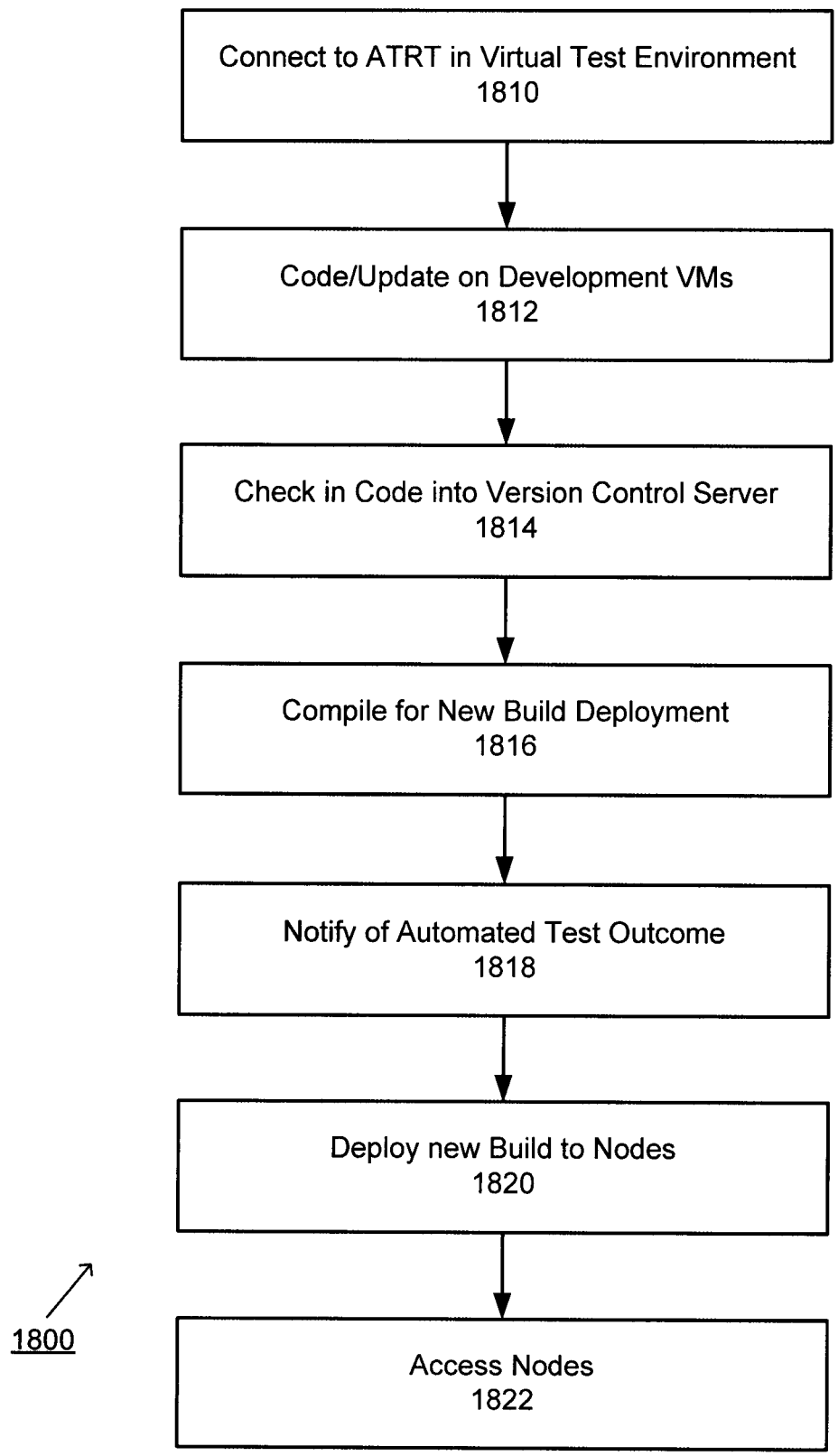
FIG. 18 is an exemplary flowchart illustrating automated test and re-test in a virtual test environment, according to an embodiment of the present invention.

FIG. 18 is an exemplary flowchart illustrating automated test and re-test in a virtual test environment, according to an embodiment of the present invention. This method is provided by way of example, as there are a variety of ways to carry out the methods described herein. Method 1800 shown in FIG. 18 may be executed or otherwise performed by one or a combination of various systems. The method 1800 may be carried out through system 1700 of FIG. 17 by way of example. Each block shown in FIG. 18 represents one or more processes, methods, or subroutines carried out in method 1800.

At step 1810, a user may connect to the ATRT virtualized test environment. At step 1812, developers may code and/or update the code on development VMs. At step 1814, developers may check in code into Version Control server. For example, a Build Server may conduct automated periodic checkouts. At step 1816, a new build deployment may be compiled. For example, a Build Server may compile and package a new build for deployment. Periodic automated tests may be run. At step 1818, users may be notified of the automated test outcome. At step 1820, the Build Server may deploy the new build to the nodes. At step 1822, testers may access the nodes and create and/or run the automated tests. Various users, including testers, developers, may conduct the automated testing lifecycle activities and maintain various ATRT test artifacts in the virtual environment, as described in FIG. 1, above.

According to an embodiment of the present invention, ATRT may be Graphical User Interface (GUI) technology independent and may further allow for GUI automated testing. In addition, ATRT allows for message based testing between interfaces using various protocols (e.g., UPD, TCP/IP, CORBA, http, etc.). With the ATRT virtualized test environment, a single user may control an entire test of complex systems as well as perform analysis from one tool with a computing device to make a network connection.

Figure 19:
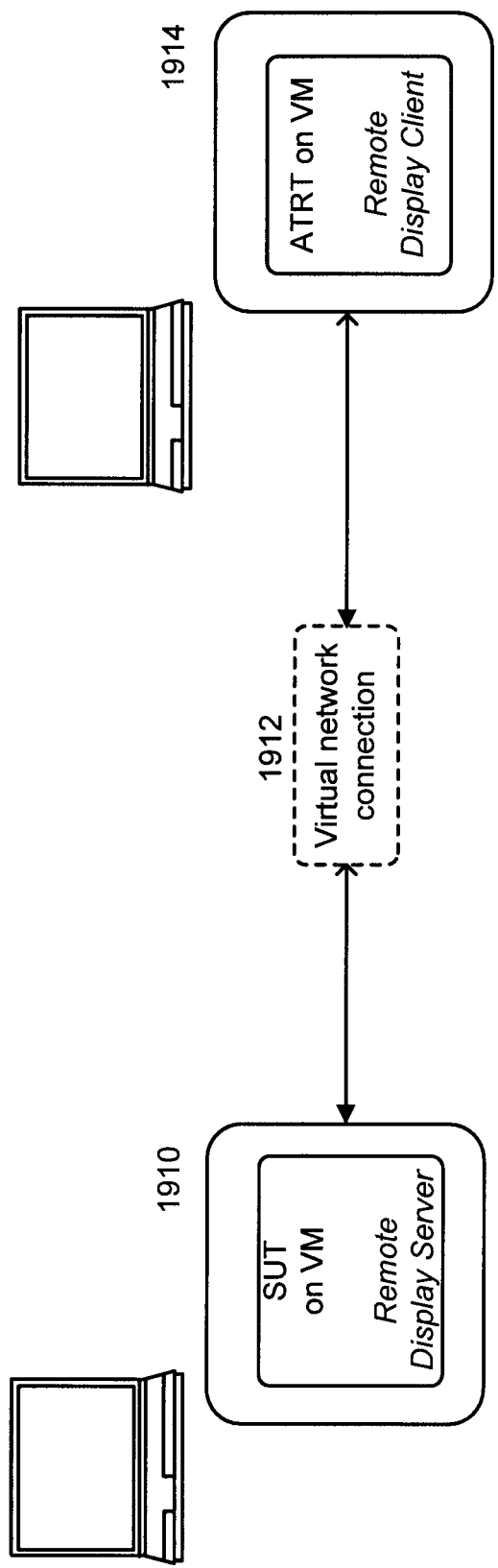
FIG. 19 is an exemplary configuration in a virtual machine environment, according to an embodiment of the present invention.

FIG. 19 is an exemplary configuration in a virtual machine environment, according to an embodiment of the present invention. As shown here, System Under Test may run on a Virtual Machine, shown by 1910. The SUT may be on a virtual environment, as a standalone application. ATRT may be executed on a virtual machine in a virtual environment, as shown by 1914. 1910 may represent a Remote Display server and 1914 may represent a Remote display client, where 1912 represents a virtual network connection. ATRT functional tests may be developed and executed. Multiple connections to SUT VM machines may be made from one ATRT machine where various combinations of ATRT tests may be executed in parallel or simultaneously and across connected virtual machines. This virtualization setup provides a multi-user access automated testing solution that allows users to implement and reuse ATRT, along with testing artifacts, such as automated test cases and other test use cases on a provisioning basis.

Figure 20:
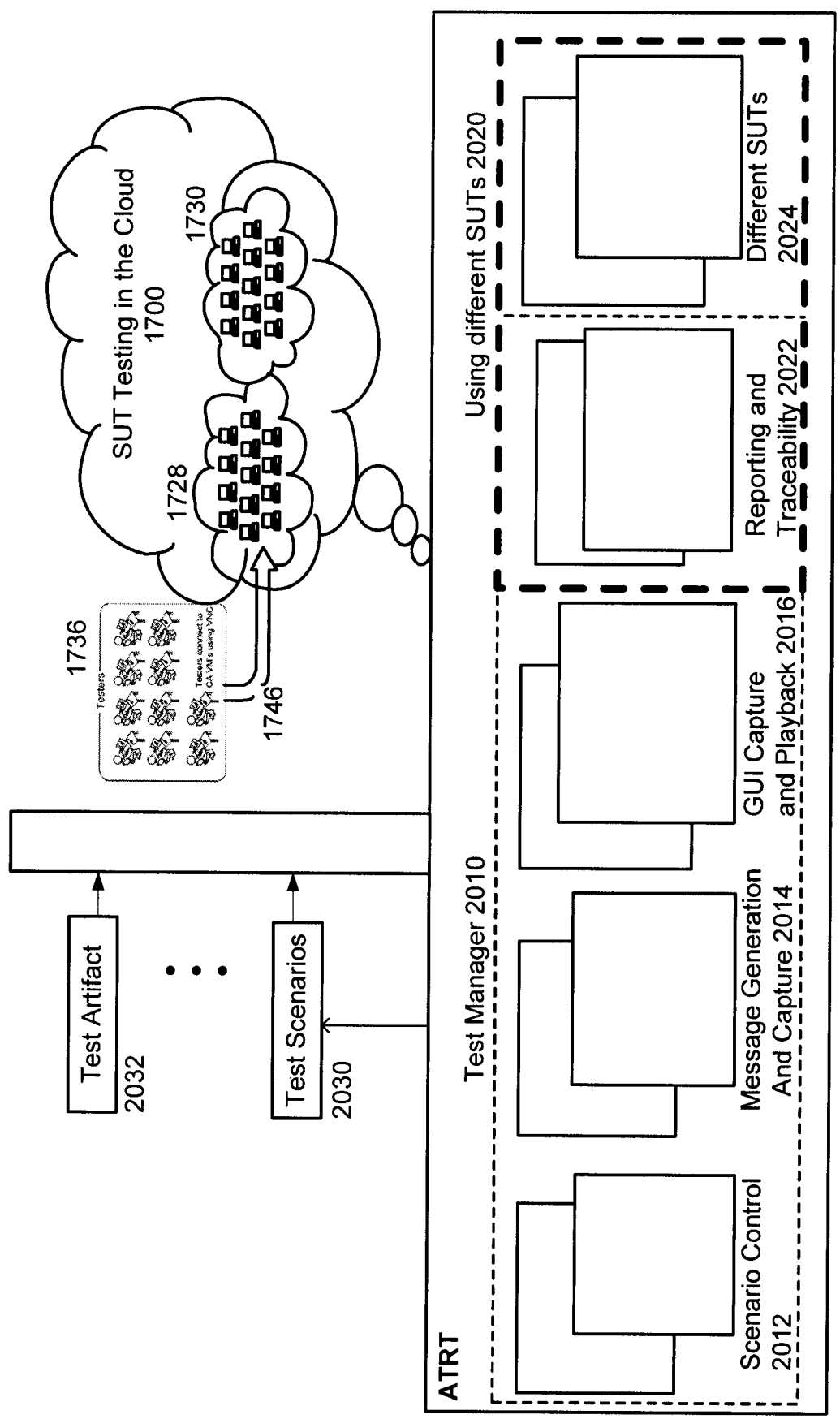
FIG. 20 is an exemplary process diagram for Test Manager in the VM environment, according to an embodiment of the present invention.

FIG. 20 is an exemplary process diagram for Test Manager in the VM environment, according to an embodiment of the present invention. A user may access Test Manager 2010 via a user interface. For example, testers 1736 may connect to SUT testing in a virtual environment, shown by 1700, via a connection shown by 1746. Testers may access nodes 1728 and 1730 (from FIG. 17). Test Manager 2010 may provide various functions, including Scenario Control 2012, Message Generation and Capture 2014 and GUI capture and playback 2016. Via Test Manager 2010, test artifacts 2032 and test scenarios 2030 may be generated and/or executed. Other functionality from SUTs may be provided as well, shown by 2020. Additional functionality may include Reporting and Traceability 2022 and Different SUTs 2024.

An embodiment of the present invention is directed to an integrated development environment (IDE) that provides a common interface for third party developers to drive and/or interface with a Virtual Test Bed (VTB), which may represent virtual testing environments, e.g., SUTs on VMs, etc. The IDE may represent an interface to multiple versions of ATRT running on various SUTs on VMs, at the same or various locations.

Figure 21:
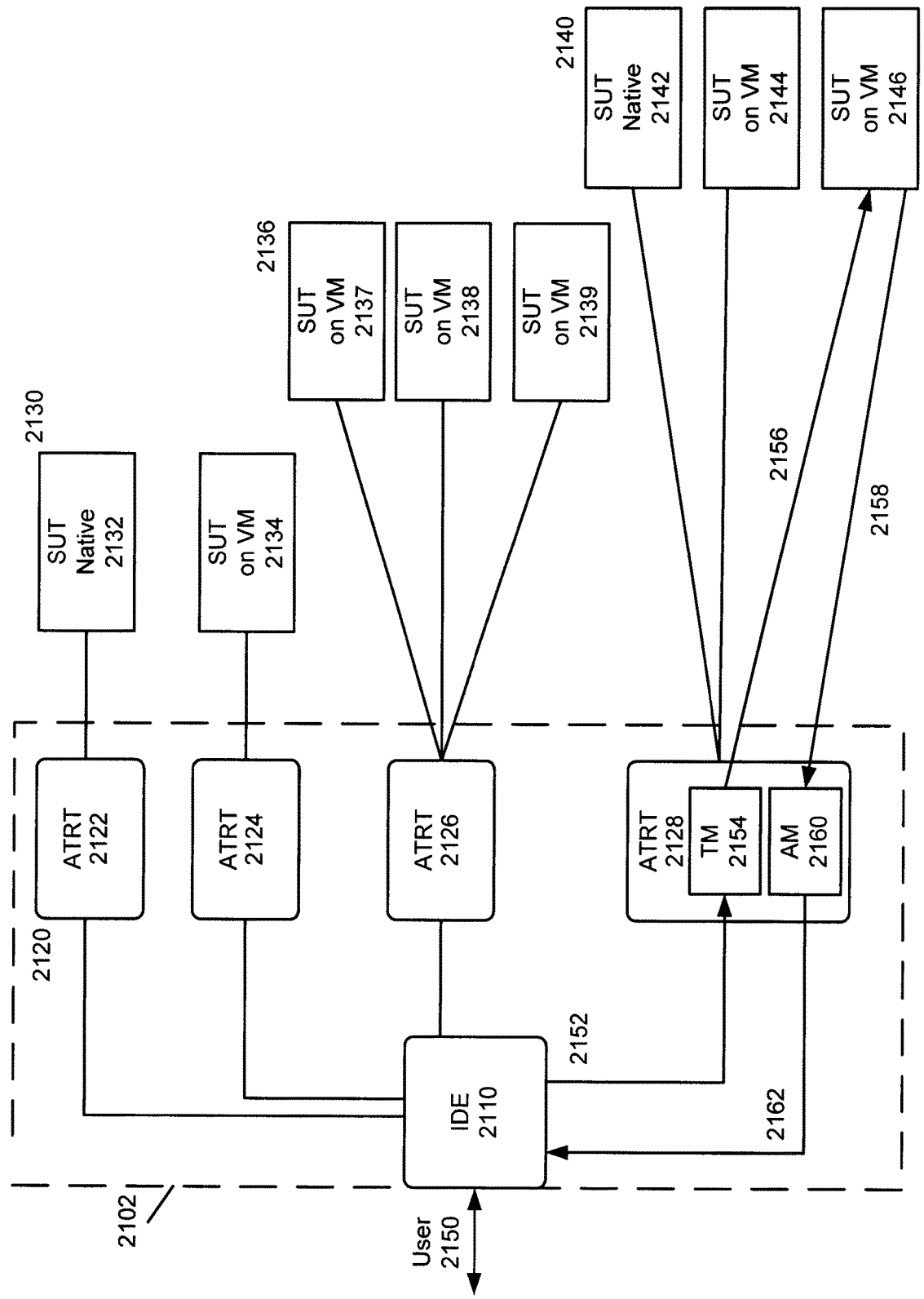
FIG. 21 is an exemplary configuration in a virtual machine environment, according to an embodiment of the present invention.

FIG. 21 is an exemplary configuration in a virtual machine environment, according to an embodiment of the present invention. FIG. 21 illustrates an exemplary illustration for managing multiple instances of ATRT and testing multiple SUT virtual machines. As shown here, a user interface, IDE 2110, may enable a user to manage one or more instances of ATRT running on various SUTs. IDE 2110 may enable a user to interact with the virtual environments. For example, ATRT may be executed on a series of Virtual Machine, as shown by 2122, 2124 and 2126 as well as collectively by 2120. ATRT testing may be executed for multiple SUT virtual machines, as shown by 2132, 2134 as well as collectively by 2130. In this example, each ATRT on VM may represent a Remote Display client and each SUT may represent a Remote Display server.

IDE 2110 may communicate with various instances of ATRT on a single system, as shown by the dotted lines 2102. Also, IDE 2110 may remotely communicate with one or more multiple instances of ATRT. Various other architectures and configurations may be realized.

As shown here in FIG. 21, a user may run one or more tests in parallel, simultaneously, sequential and/or other user specified order on various different SUTs on various different ATRTs. For example, a user may send a set of commands that specifies what tests to run on a particular version of one or more SUTs, where the SUTs may be managed by a single ATRT as well as across multiple ATRTs. From IDE 2110, the user may send a command to each ATRT (or selected one or more ATRTs) to specify what tests to run on.

A user may also manage files using IDE 2110. For example, the user may identify and send files as part of the testing procedure. An embodiment of the present invention may enable a user to move information, e.g., data files, from IDE 2110 to an ATRT test manager to run the tests. Also, the user may receive files, e.g., data, results, reports, etc. In this example, once the test is recorded, data may be analyzed and processed in the form of reports and/or other output which may then be displayed or sent to the user or other specified destination or recipient.

In addition, ATRT may manage a physical SUT 2132 (running on a native environment) as well as a single SUT on VM 2134 and/or multiple SUTs on VM, shown by 2137, 2138 and 2139 as well as collectively as 2136. An instance of ATRT may also manage mixed types of SUTs. For example, ATRT 2128 may manage SUTs running on a native environment, e.g., physical SUT 2142, and SUTs running on a virtual environment, e.g., SUTs on VMs 2144, 2146, shown collectively as 2140.

An exemplary application may involve a user 2150 interacting with IDE 2110. The user may input or select commands for the ATRT, as shown by 2152. The commands may indicate what tests to run and what version of the SUT to run the tests on. ATRT 2128 may then execute the tests, via Test Manager 2154, on the identified one or more SUT, illustrated by 2156. The commands may be executed on a single SUT or multiple SUTs, managed by the same ATRT as well as across other ATRTs. The data or test results may be returned, via 2158, and received by Analysis Manager 2160. Analysis Manager 2160 may then process the data and generate reports, graphics and/or other outputs to the user 2150, via IDE 2110, as shown by 2162.

The ATRT virtual test environment additionally reduces maintenance cost. For example, in the ATRT virtual test environment, a system administrator may push out any tool upgrades or SUT changes via an interface, IDE.

IDE functionality may include message-to-function translation, development of utility scripts, window display and data analysis. Message-to-function translation may execute functions/tasks associated with a library, test manager, scenario control, a VM server farm, hardware, and data recording and analysis manager. Utility scripts may be developed to perform various tasks associated with test control, analysis control and library control. Test control may refer to functionality associated with Test Manager, e.g., generate tests, execute tests, etc. Analysis control may refer to functionality corresponding to Analysis Manager, e.g., data recording, analysis of results, generation of reports, etc. Library control may refer to features and functions involving specifics of the SUT, e.g., version of software to run, managing files, etc.

Window display may provide a display of selected ATRT Remote Display client sessions, where a user may select one or more sessions for display. For example, a user may view an active session on a particular SUT running a specific test. Also, a user may compare the same test running on two or more different SUTs. A user may manage multiple instances of ATRT, where ATRT may manage testing on a single SUT, a SUT on VM as well as multiple SUTs on various types of environments. Various forms of data analysis may be provided, including message-based test analysis. A user may view and analyze various types of reports. For example, ATRT may compare an expected response model to data collection containing actual responses and provide a pass/fail report. ATRT may also import data provided by data recorded by Analysis Manager.

Figure 22:
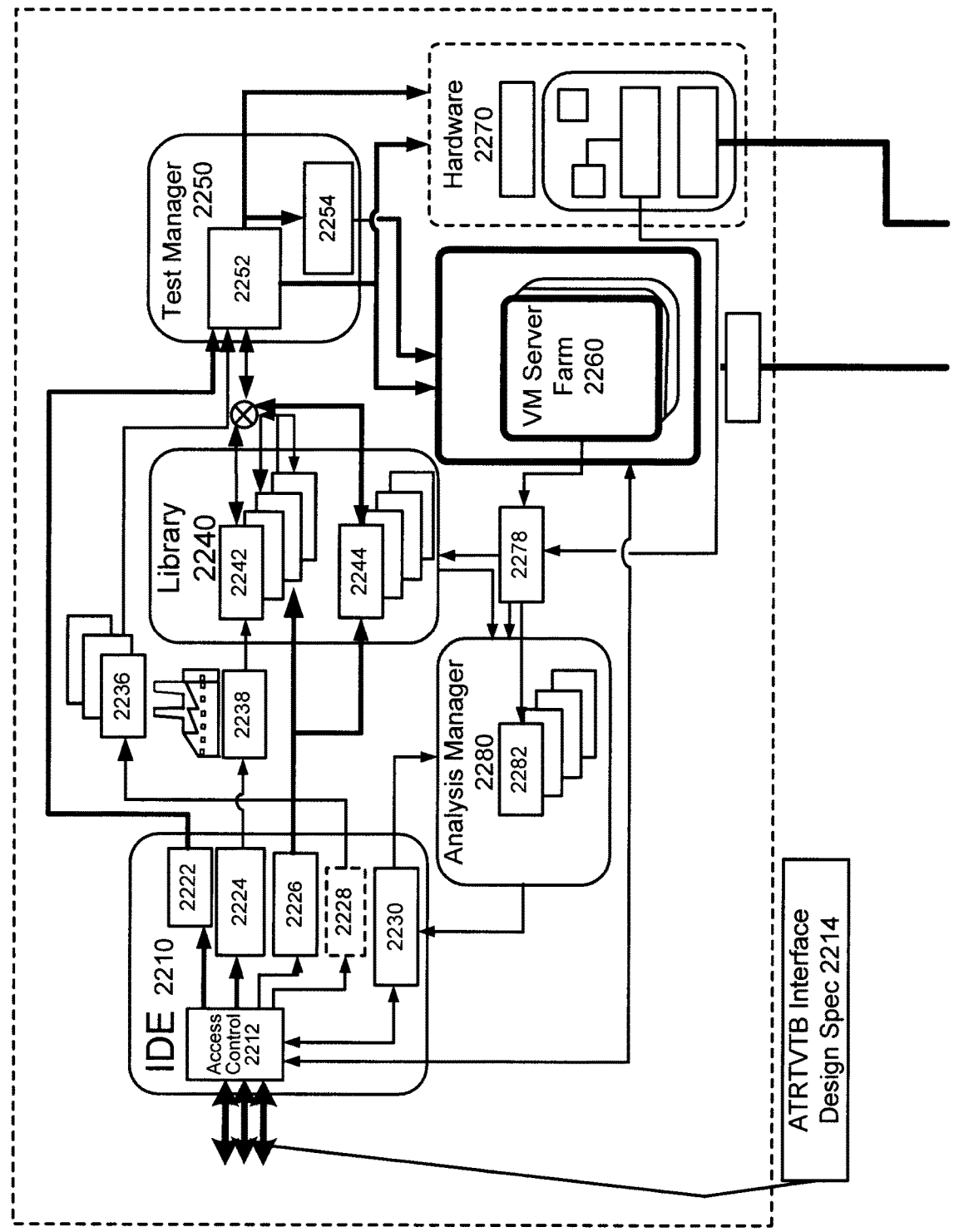
FIG. 22 is an exemplary diagram of an integrated development environment (IDE), according to an embodiment of the present invention.

FIG. 22 is an exemplary diagram of an integrated development environment (IDE), according to an embodiment of the present invention. As shown in FIG. 22, the IDE may represent an interface to multiple versions of ATRT running on multiple SUTs on VMs, located locally or remotely. The SUTs may also run on native or other environments.

IDE 2210 may provide a user interface for managing multiple ATRTs for multiple SUTs on various environments. FIGS. 25-32 below illustrate exemplary IDE interfaces. IDE 2210 may communicate with Library 2240 and Test Manger 2250, which in turn communicates with VM Server Farm 2260 and Hardware 2270. IDE 2210 may also receive analysis of test results from Analysis Manager 2280. Server Farm 2260 may represent a collection of computer servers maintained by an enterprise to accomplish server needs far beyond the capability of one machine. For example, server farms may be used for cluster computing. In this example, Server Farm 2260 represents multiple SUTs on VMs. Hardware 2270 represents SUTs on native environments. Other environments and applications may be supported.

IDE 2210 may include Access Control 2212 for communicating with one or more remote users as well as an Interface Design Spec 2214. Access Control 2212 may also communicate with Test Control 2222. Test Control 2212 may interface with Test Manager 2250 to execute test manager functionality, via Test Control TM 2252. Load/Upload 2224 may interface with the Library 2240, via VM ware 2238. Library 2240 may store and manage information concerning various versions of software to run on the SUTs. In other words, a user may specify a particular software version to run on the SUT from Library 2240. For example, a user may want to run a first test with version 1.0, run a second test with version 1.1 and then run the first test with version 1.5. The tests may be run concurrently, simultaneously, sequentially and/or other selected order or preference. With IDE 2210, a user may specify and control the actual version of the SUT to be loaded and used on the virtual machine, via Library 2240.

Load/Upload script files 2226 may also interface with Library 2240 via Sim/Stim 2242 and script 2244. For example, Library 2240 may indicate which version of the software to run on the SUT, via VM 2242. Also, software particularities may also be identified from Library 2240, via Scripts 2244. Hardware 2228 may forward hardware specific information to Test Requirement 2236 for Test Control TM 2252 in Test Manager 2250. Analysis Module 2230 may interface with Analysis Manager 2280. As shown here, Analysis Module 2280 may execute multiple instances of Analysis Tool 2282.

Hardware 2270 represents hardware components associated with various SUTs running on a native environment. Under Test Manager 2250, Test Control 2252 may run various executions on VM Server Farm 2260 and Hardware components, represented by 2270. VM sim/Stim 2254 may represent one or more simulators, e.g., simulated stimulation, for VM Server Farm 2260. VM Server Farm 2260 and Hardware 2270 may communicate to and/or include various simulators. An embodiment of the present invention may be used with virtual machines, shown by 2260, together with actual SUTs running on their native hardware, shown by 2270. Because many machines may be available, as shown by VM Server Farm 2260, a user may specify what applications may be initiated given the tests to be executed, using IDE 2210. DX/DR 2278 represent data recording functionality, which may be fed into Analysis Manager 2280. While a single DX/DR is shown for illustrative purposes, multiple instances of DX/DR may be provided to record data on various SUTs. Here, the recorded data from DX/DR 2278 may be evaluated by Analysis Manger 2280 and then presented to IDE, via Analysis module 2230.

Figure 23:
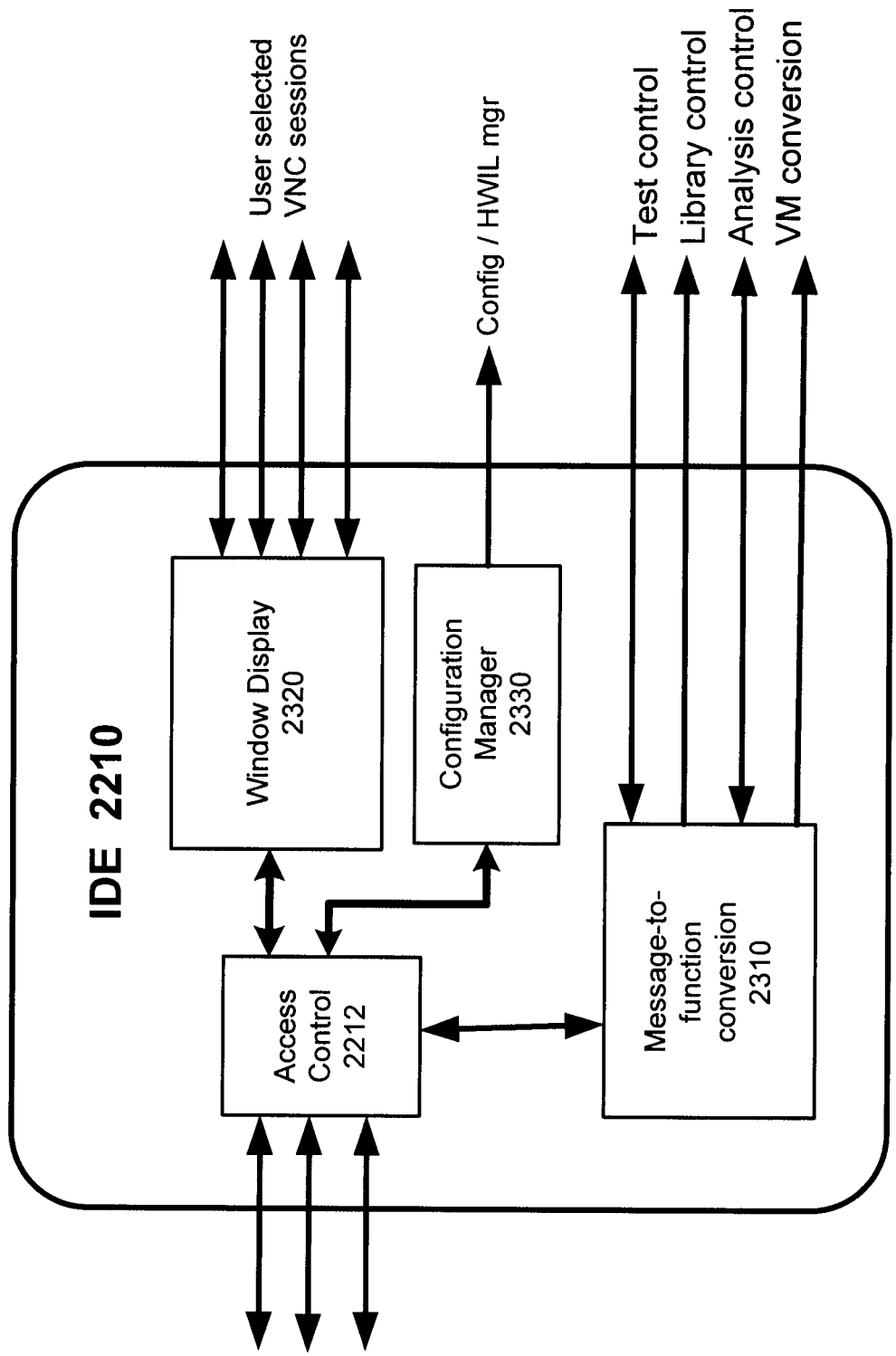
FIG. 23 is an exemplary diagram of an integrated development environment (IDE), according to an embodiment of the present invention.

FIG. 23 is an exemplary diagram of an integrated development environment (IDE), according to an embodiment of the present invention. Access Control 2212 may interface with Message-to-Function conversion 2310. Based on the message, various functions may be executed. For example, Message-to-Function Conversion 2310 may perform functionality associated with testing control, library control, analysis control and virtual machine conversion. Message-to-Function Conversion 2310 may receive user inputs, e.g., messages, at the IDE and may then translate the messages to an appropriate function which may then be sent to the appropriate module, e.g., test manager, library control, analysis control, for execution. For example, using the IDE, a user may identify what tests to run, what software to load and what analysis to be done. These inputs or messages may be converted to an appropriate function, such as tests which may be sent to Test Manager, software version which may be sent to Library, and reports which may be sent to Analysis Manager.

Window display 2320 may provide a display of one or more SUTs for analysis and review. For example, the user may select to view actual displays of one or more SUTs, during testing. The displays may be further customized based on user selected preferences as well as specific Remote display client sessions. Configuration Manager 2330 may interface with the hardware components of the SUT for testing on native environments.

Figure 24:
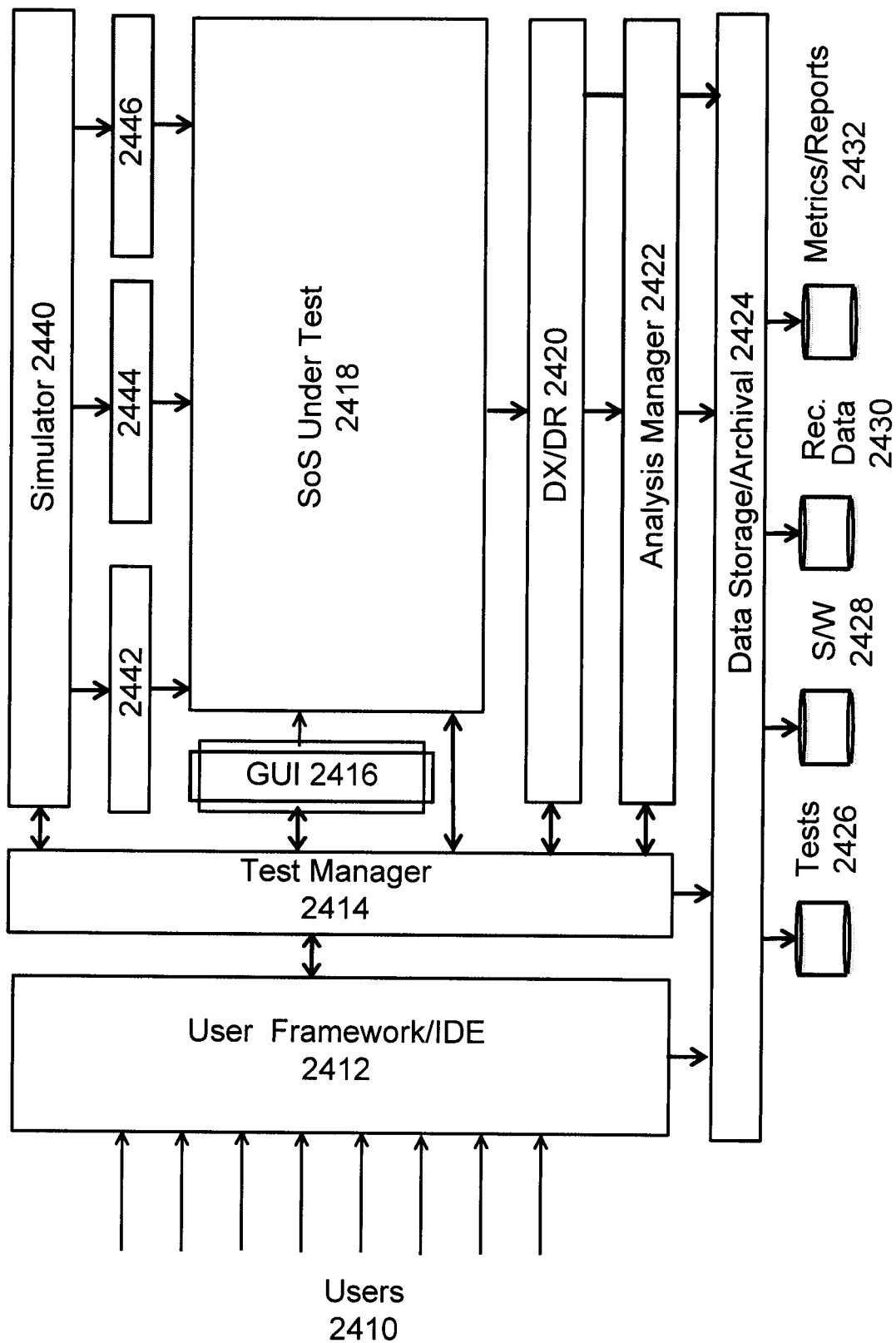
FIG. 24 is an exemplary system framework for an integrated development environment (IDE), according to an embodiment of the present invention.

FIG. 24 is an exemplary system framework for an integrated development environment (IDE), according to an embodiment of the present invention. Users 2410 may access User Framework/IDE 2412. As shown in FIG. 24, one or more users may access the IDE 2412. IDE 2412 may interface with Test Manager 2414, which in turn interfaces with a GUI 2416. User interface, via GUI 2416, may enable users to easily modify configurations. Also, users may select and control reconfiguration of VTB with different platforms. The VTB may perform various levels of testing, including platform, system and subsystem level testing.

Test Manger 2414 provides the ability to create, modify, delete and/or otherwise manage various tests. An embodiment of the present invention may provide automated execution of tests or operator in loop/semi-automated execution. For example, tests may be executed with real-time interactions with users. Also, system status information may be displayed to keep the tester informed. Test Manager 2414 further provides test results management functionality, including notifying one or more users of test completion and results availability. Also, test results may be displayed to one or more users, based on user preferences and profile information. Moreover, test results and data may be promulgated. User collaboration functionality may also be provided where users may view blogs, posts, upload and/or respond to comments, share analysis and/or perform other interactive functions with other users.

GUI 2416 may access Systems of Systems (SoS) under Test 2418. The systems under test may be represented on a virtual machine, at a single location or dispersed across multiple locations. Simulators may be provided by Simulator 2440 and other simulators represented by 2442, 2444, and 2446. Specific simulators for certain systems may be used. The simulators may be used for each of the SUTs, represented by 2418. Test Manager 2414 may interact with the simulators 2440-2446 and SUTs 2418. DX/DR 2420 may record testing data and interface with Analysis Manager 2422. For example, an embodiment of the present invention may provide stimulated data input and/or playback of recorded data. In addition, an embodiment of the present invention may support computation of various metrics as well as user selected analysis cases and other user defined inputs. The analysis and associated data may be stored at a library, represented by Data Storage/Archival 2424. From there, various forms of outputs may be generated, such as Tests 2426, Software 2428, Recorded Data 2430, Metrics/Reports 2432. Other types of outputs, interfaces, reports and/or displays may be realized.

FIGS. 25-32 illustrate exemplary screenshots of an integrated development environment remotely connected to an ATRT manager, in accordance with various embodiments of the present invention. A user may manage multiple instances of ATRT on multiple SUTs running on various environments, e.g., virtual as well as native.

Figure 25:
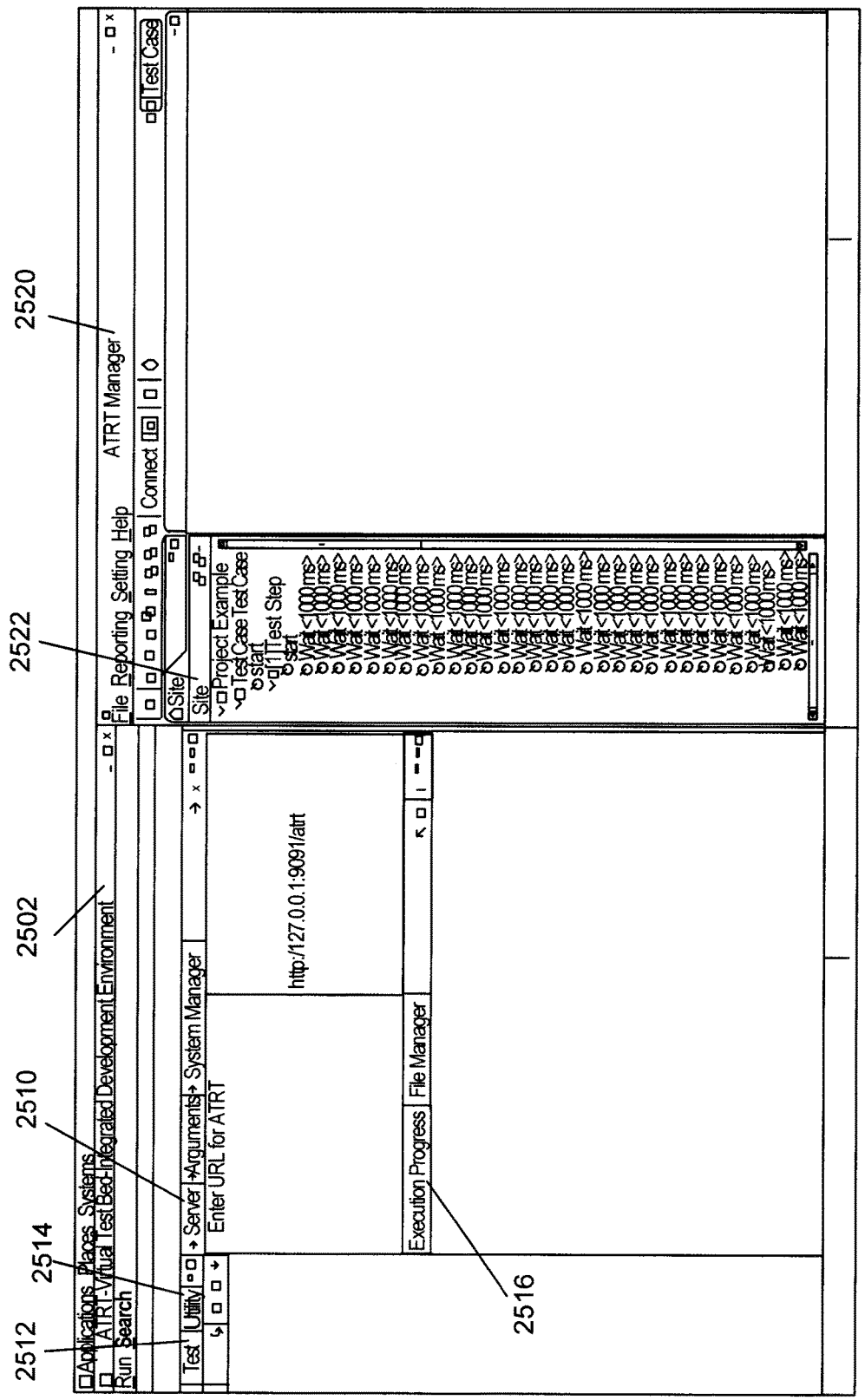
FIG. 25 is an exemplary screenshot illustrating an integrated development environment, according to an embodiment of the present invention.

FIG. 25 is an exemplary interface illustrating features associated with an IDE of an embodiment of the present invention. By selecting Server Tab 2510, a user may identify and connect to an ATRT server. For example, the user may identify a URL or other identifier associated with the ATRT server. From IDE 2502, the user may remotely connect to the identified ATRT Server, an exemplary display is shown by ATRT Manager 2520.

Corresponding folders projects, tests cases, etc., may be displayed at Site Tab 2522 on the ATRT Manager 2520. While a single instance of ATRT is shown, the IDE 2502 may remotely connect to multiple ATRTs, each managing one or more SUTs in various environments.

IDE 2502 may also provide a listing or display of Tests, shown by 2512, and Utilities, shown by 2514. By selecting Test Tab 2512, corresponding tests may be displayed. Tests may refer to automated test steps for execution on a SUT. Corresponding utilities may be displayed at 2514. Utilities may refer to functions for execution on a SUT. For example, utilities may be generic and reusable on other SUTs. By selecting Execution Progress tab 2516, status information for the selected Server may be provided.

Figure 26:
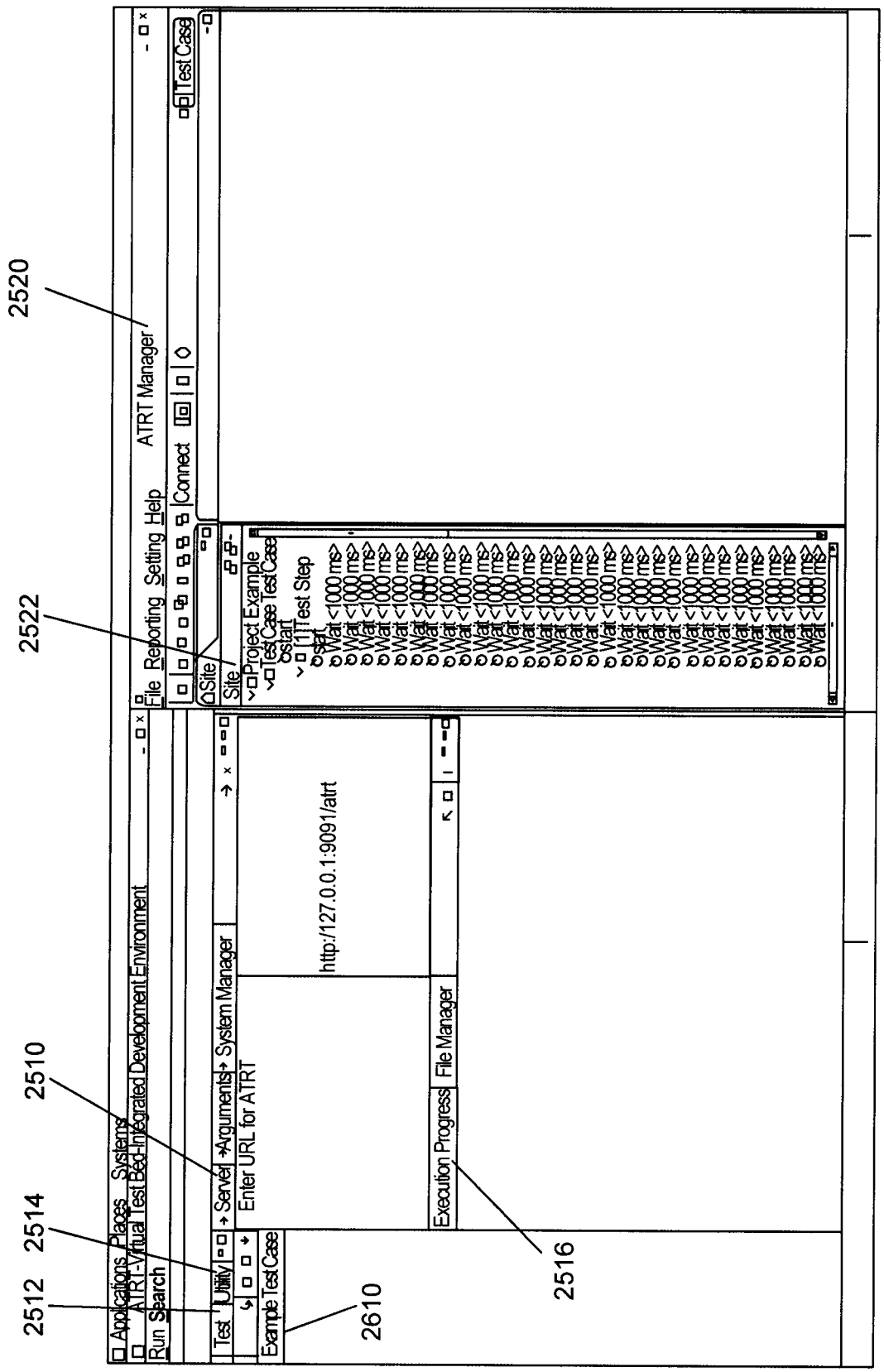
FIG. 26 is an exemplary screenshot illustrating an integrated development environment, according to an embodiment of the present invention.

FIG. 26 is an exemplary screenshot illustrating an integrated development environment, according to an embodiment of the present invention. As shown here, an exemplary test case is shown at 2610, under the Test Tab 2512. As discussed above, the user may remotely connect to an ATRT Server, an exemplary display is shown by ATRT Manager 2520, with corresponding projects at Site Tab 2522.

Figure 27:
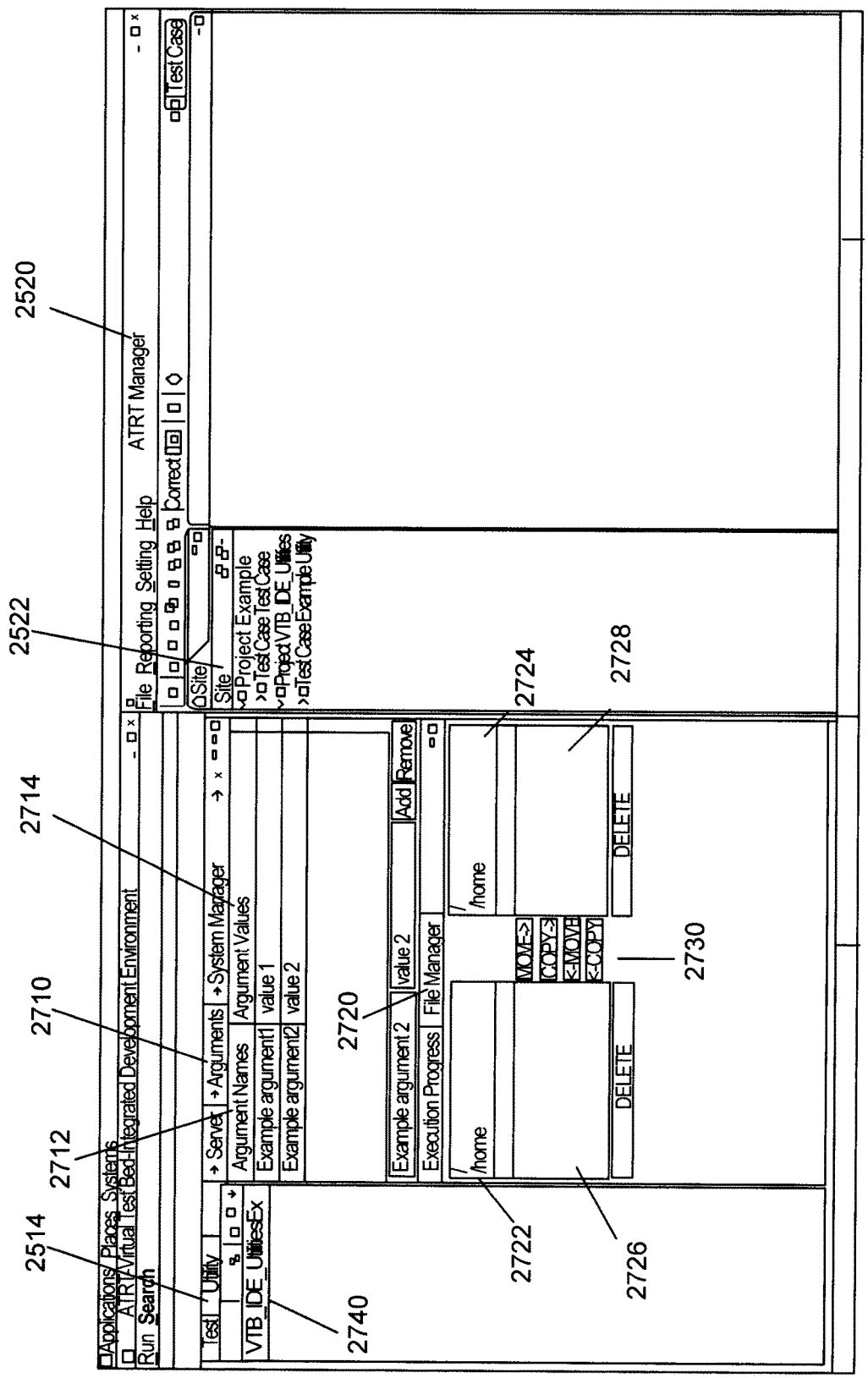
FIG. 27 is an exemplary screenshot illustrating an integrated development environment, according to an embodiment of the present invention.

FIG. 27 is an exemplary screenshot illustrating an integrated development environment, according to an embodiment of the present invention. By selecting Arguments Tab 2710, Argument Names 2712 and Argument Values 2714 may be displayed. For example, data recording may be executed with arguments, e.g., load, setup, run, halt, etc. Also, test procedures may be executed with arguments, e.g., load, setup, run, halt, etc. For example, a user may pass arguments, shown under Arguments Tab 2710, to a utility function 2740, shown under Utilities Tab 2514. The user may also add, remove and/or perform other management functions related to arguments.

File Manager 2720 enables a user to move and copy files from one location to another. Library functionality may also be performed using arguments, e.g., add, delete, move files to, move files from, etc. In this example, directory "home" is shown at 2722 and at 2724. Within directory home, various files may be moved, copied and/or otherwise managed using windows 2726 and 2728, along with Move and Copy buttons shown at 2730. The user may also add, remove and/or perform other management functions related to files, folders and associated data.

In this example, Utilities Tab 2514 displays an exemplary utility called VTB_IDE_UtilitiesEx, at 2740.

As discussed above, the user may remotely connect to the identified ATRT Server and view an exemplary display shown by ATRT Manager 2520. Corresponding folders projects, tests cases, etc., may be displayed at Site Tab 2522 on ATRT Manager 2520. In this illustration, the folders have been condensed to show main folders Project Example having folder Test Case Test Case and Project VTB IDE Utilities having folder Test Case Example Utility.

Figure 28:
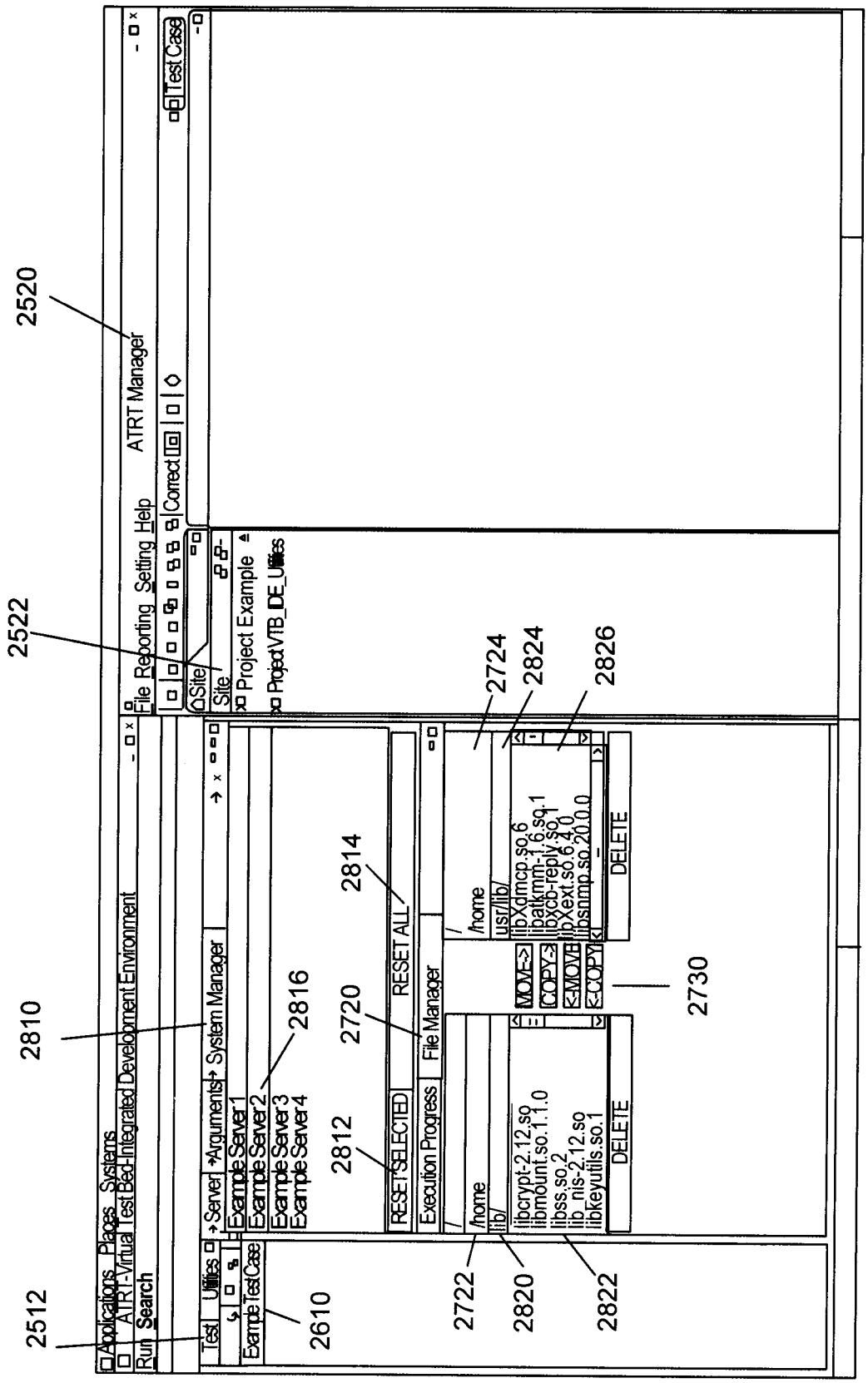
FIG. 28 is an exemplary screenshot illustrating an integrated development environment, according to an embodiment of the present invention.

FIG. 28 is an exemplary screenshot illustrating an integrated development environment, according to an embodiment of the present invention. By selecting System Manager Tab 2810, a user may select and reset various SUTs to start at the beginning or at a predetermined location. As shown here, a user may select Example Server 2 as shown 2816, from a selection of four servers. The user may reset the selected Server by selecting Reset Selected at 2812. Also, the user may reset multiple servers or even all servers by selecting 2814. Through the IDE, a user may manage and/or connect to different systems based on various servers.

As discussed above, File Manager 2720 enables a user to move and copy files from one location to another. FIG. 28 provides additional details of the File Manager functionality. In this example, directory "home" is shown at 2722 and at 2724. Within the directory home, a first file is selected at 2820, where corresponding folders are displayed at 2822. Within the directory home, shown at 2724, a second file is selected at 2824, where corresponding folders are displayed at 2826. Various files and/or data may be moved, copied and/or otherwise managed by selecting at 2822 and 2826 and using Move and Copy buttons shown at 2730. The user may also add and delete files. Other file management functionality may also be provided.

As discussed above, the user may remotely connect to the identified ATRT Server and view an exemplary display shown by ATRT Manager 2520. Corresponding folders projects, tests cases, etc., may be displayed at Site Tab 2522 on the ATRT Manager 2520. In this illustration, the folders have been condensed to show main folders Project Example and Project VTB IDE Utilities.

Figure 29:
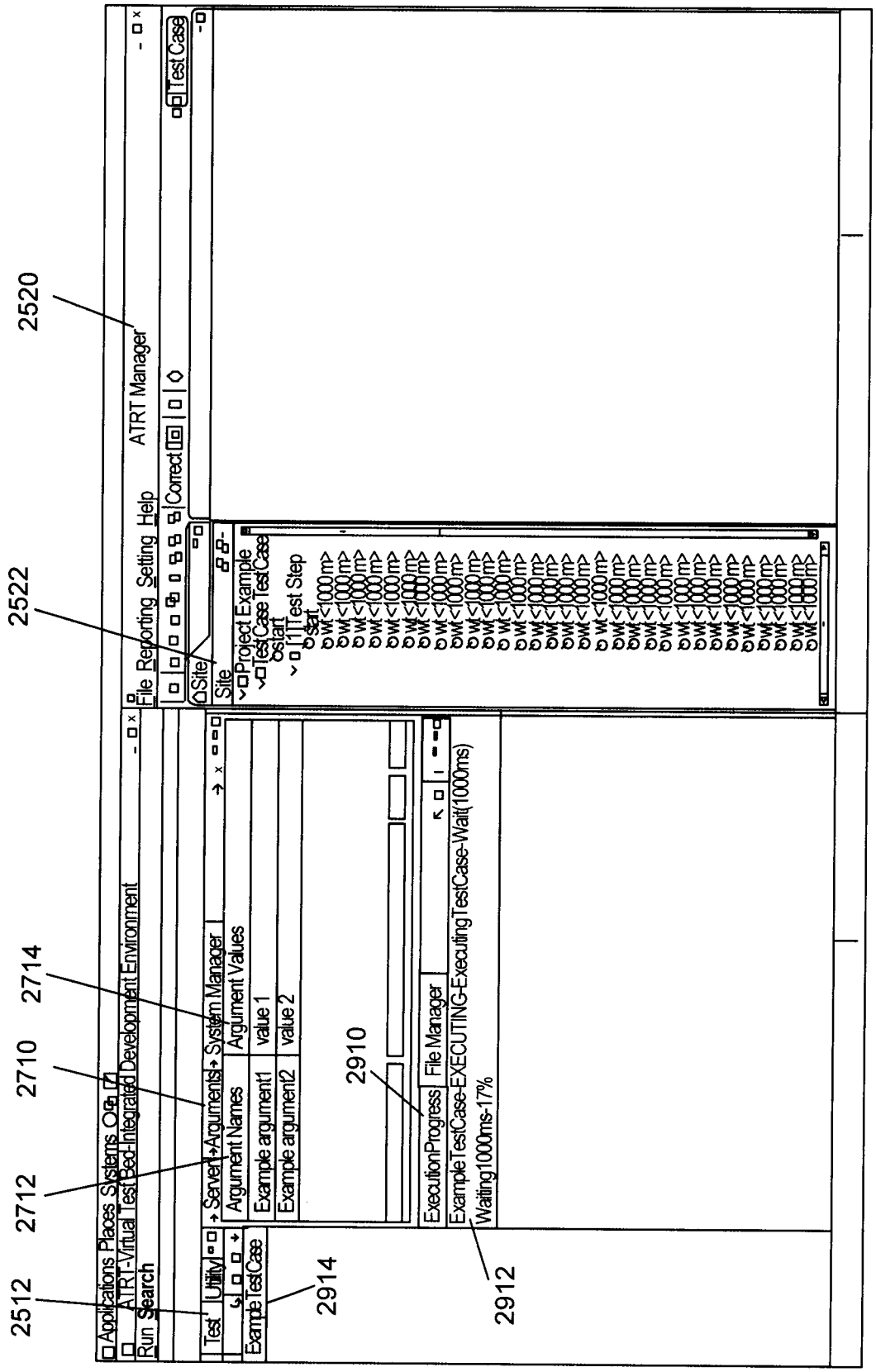
FIG. 29 is an exemplary screenshot illustrating an integrated development environment, according to an embodiment of the present invention.

FIG. 29 is an exemplary screenshot illustrating an integrated development environment, according to an embodiment of the present invention. By selecting Arguments Tab 2710, Argument Names 2712 and Argument Values 2714 may be displayed. For example, a user may pass arguments, shown under Arguments Tab 2710, to a test case 2914, shown under Test Tab 2512.

By selecting Execution Progress Tab 2910, a user may view status information for the selected test case, at 2914. The status shows that the test case is 17% completed, as indicated at 2912.

Figure 30:
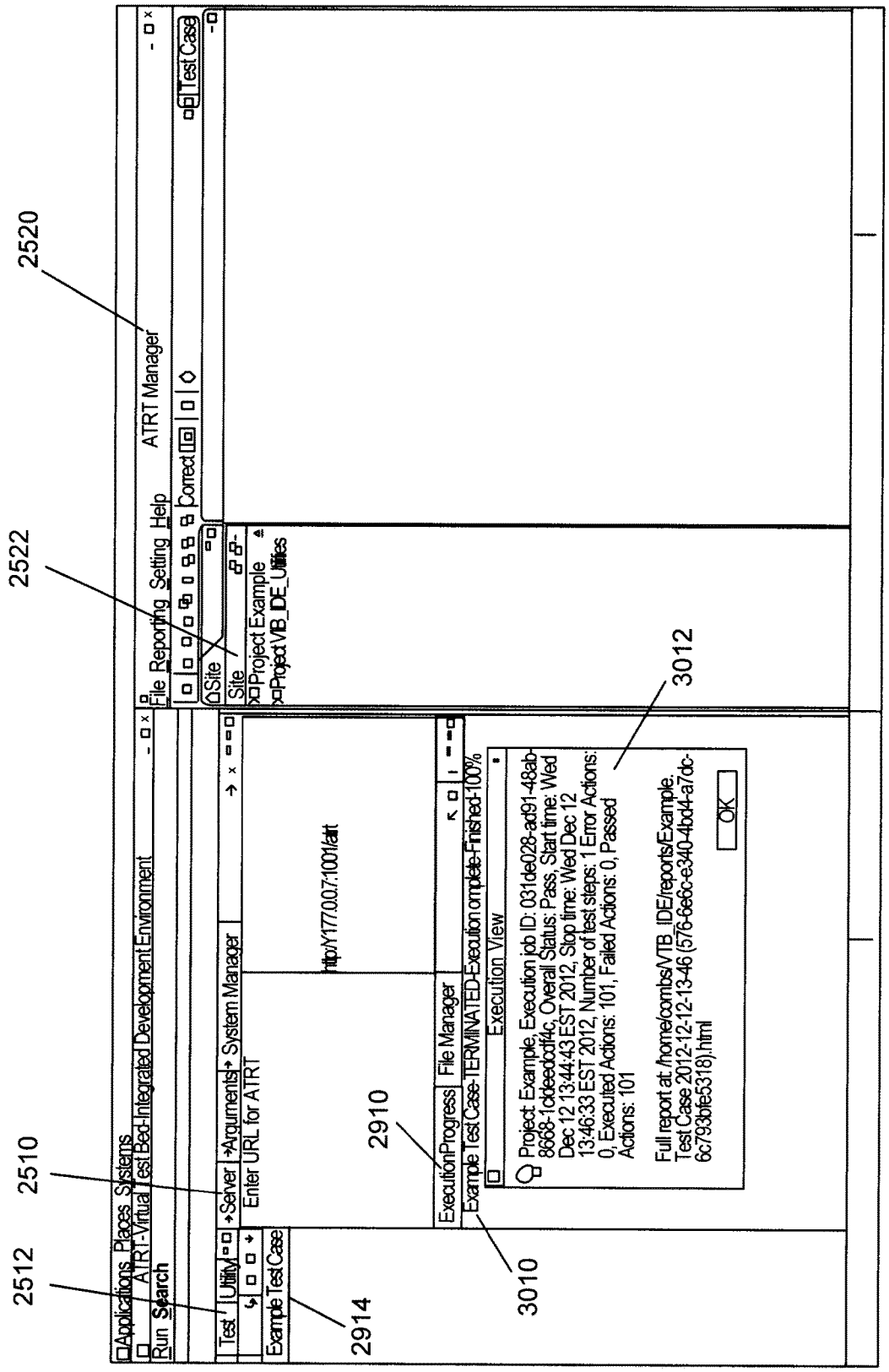
FIG. 30 is an exemplary screenshot illustrating an integrated development environment, according to an embodiment of the present invention.

FIG. 30 is an exemplary screenshot illustrating an integrated development environment, according to an embodiment of the present invention. By selecting Execution Progress Tab 2910, a user may view status information for the selected test case, identified at 2914. The status shows that the example test case is now completed, as indicated at 3010. A display 3012 is shown with details of the test case execution.

Figure 31:
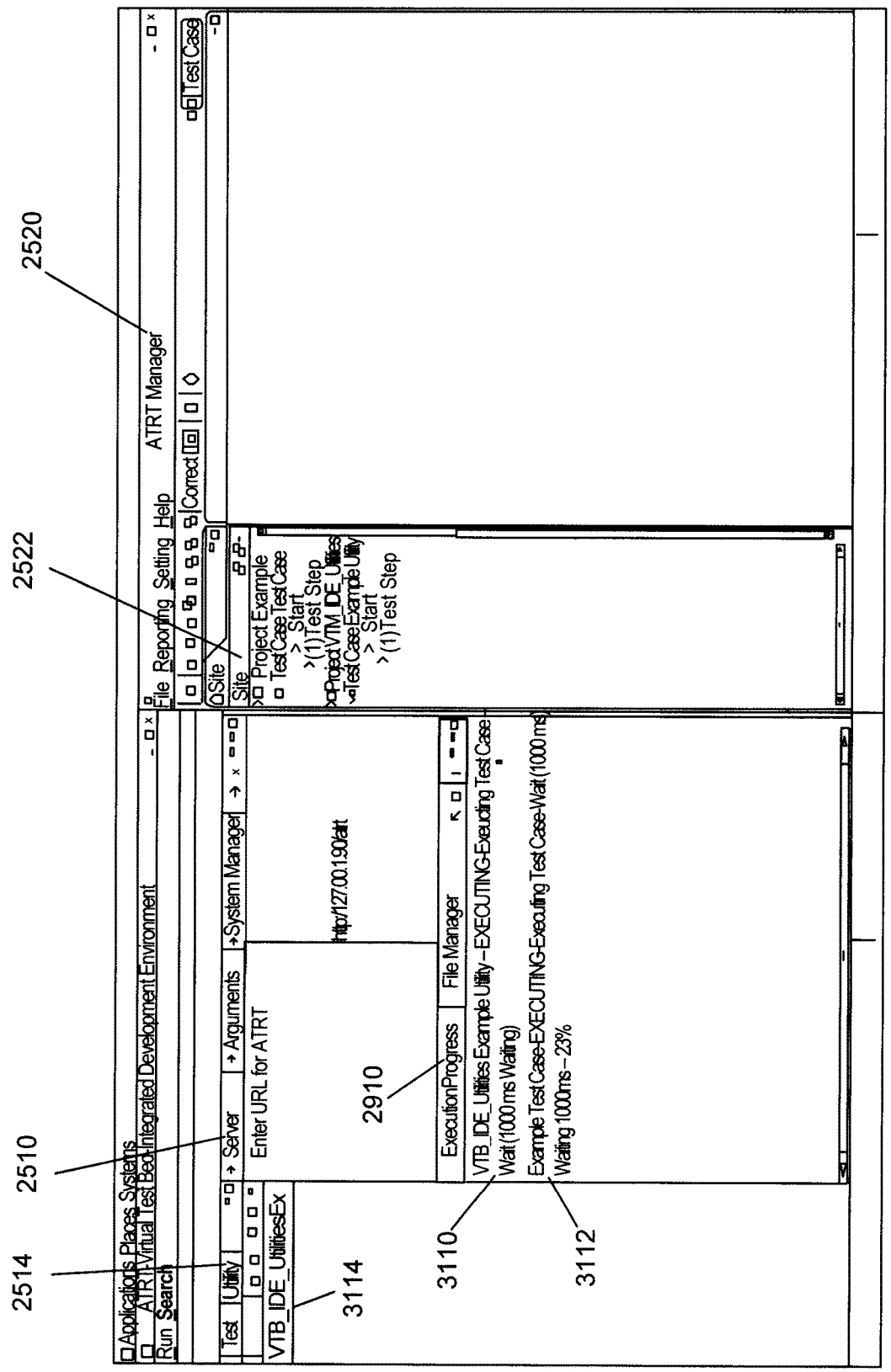
FIG. 31 is an exemplary screenshot illustrating an integrated development environment, according to an embodiment of the present invention.

FIG. 31 is an exemplary screenshot illustrating an integrated development environment, according to an embodiment of the present invention. By selecting Execution Progress Tab 2910, a user may view status information for the selected utilities case, identified by 3114. The status shows that the test case is in progress, as shown by 3112, and utilities test case is executing, as shown by 3110.

Figure 32:
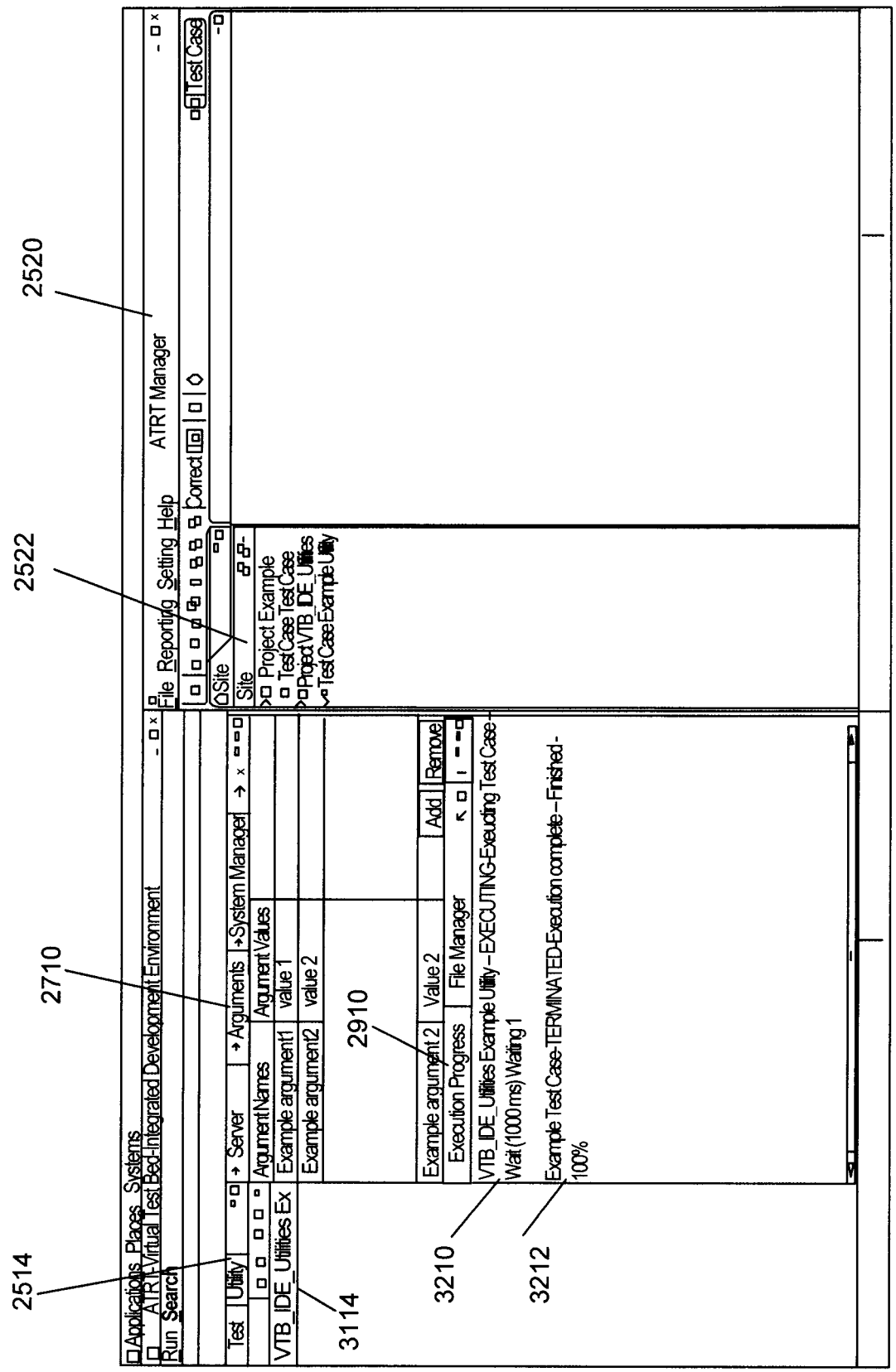
FIG. 32 is an exemplary screenshot illustrating an integrated development environment, according to an embodiment of the present invention.

FIG. 32 is an exemplary screenshot illustrating an integrated development environment, according to an embodiment of the present invention. At Execution Progress tab 2910, a user may view status information for the selected utilities case, shown by 3114. The status shows that the test case is in now complete, as shown by 3212, and utilities test case is executing, as shown by 3210.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

The description above describes communication devices, an application system, a communication network having network elements, storage devices, various networks, and other elements for coupling user via the communication network, some of which are explicitly depicted, others of which are not. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A computer implemented system for automated test and retesting in a virtual test environment using an interactive interface provided by a computer processor, the system comprising:
   an input interface, comprising at least one processor, configured to receive one or more device independent commands from a user to execute on at least one virtual machine, where the at least one virtual machine represents a simulation of multiple physical devices, wherein the one or more device independent commands comprise at least one automated test procedure and at least one system version parameter, wherein the at least one system version parameter specifies a version of software to execute as a system under test;
   an automated test and retest engine, comprising at least one processor, configured to automatically execute the one or more device independent commands on the system under test that comprises at least one virtual machine and at least one native machine concurrently, where each virtual machine emulates multiple computer environments on a virtual environment, based at least in part on the at least one system version parameter wherein the automated test and retest engine is configured to execute the one or more device independent commands on a plurality of systems under test on one or more virtual environments located at one or more remote locations and at least one native environment concurrently; the automated test and retest engine further comprising:
   a test flow tool configured to generate a plurality of automated test flows associated with the automated test procedure responsive directly and exclusively from system modeling metadata generated by a System Model that represents an expected behavior of the system under test, where the device independent commands are based on the plurality of automated test flows, the test flow tool provides modeling capability through an interface comprising a canvas display and a palette display, the canvas display configured to automatically build a corresponding automated test flow graphically represented on the canvas display and the palette display configured to display a collection of modeling components for building automated test flows on the canvas display, so that the device independent commands are executed from the plurality of automated test flows via the virtual environment independent of specific physical devices;
   an output interface, comprising at least one processor, configured to receive automated test results data responsive to execution of the one or more device independent commands via a message based testing protocol and further configured to display the results to the user; and
   an analysis manager, responsive directly to system modeling metadata generated by the System Model, configured to automatically record test results, conduct automated analysis consistent with the System Model, and provide the results data in a predetermined format to the output interface based at least in part on extracted sensor data from the system under test;
   wherein the test and retest engine comprises a software library that stores and manages a plurality of versions of a software to execute as one or more systems under test.

2. The system of claim 1, wherein the plurality of systems of tests further comprise at least one system under test executing on a native environment on hardware.

3. The system of claim 1, wherein the output interface is automatically configured to display one or more displays associated with one or more systems under test during execution of the one or more device independent commands.

4. The system of claim 1, wherein the automated test and retest engine comprises a test manager configured to manage a plurality of automated test procedures for one or more systems under test.

5. The system of claim 1, wherein the analysis manager is further configured to receive the output data from the system under test and automatically generate one or more outputs based on the output data.

6. The system of claim 1, wherein the input interface is configured to manage one or more files associated with the system under test.

7. A computer implemented method for automated test and retesting in a virtual test environment using an interactive interface provided by a computer processor, the method comprising the steps of:
   receiving, via an input interface comprising at least one processor, one or more device independent commands from a user to execute on at least one virtual machine, where the at least one virtual machine represents a simulation of multiple physical devices, wherein the one or more device independent commands comprise at least one automated test procedure and at least one system version parameter, wherein the at least one system version parameter specifies a version of software to execute as a system under test;
   automatically executing, via an automated test and retest engine comprising at least one processor, the one or more device independent commands on the system under test that comprises at least one virtual machine and at least one native machine concurrently, where each virtual machine emulates multiple computer environments on a virtual environment, based at least in part on the at least one system version parameter wherein the automated test and retest engine is configured to execute the one or more device independent commands on a plurality of systems under test on one or more virtual environments located at one or more remote locations and at least one native environment concurrently; the automated test and retest engine further comprising a test flow tool configured to generate a plurality of automated test flows associated with the automated test procedure responsive directly and exclusively from system modeling metadata generated by a System Model that represents an expected behavior of the system under test, where the device independent commands are based on the plurality of automated test flows, the test flow tool provides modeling capability through an interface comprising a canvas display and a palette display, the canvas display configured to automatically build a corresponding automated test flow graphically represented on the canvas display and the palette display configured to display a collection of modeling components for building automated test flows on the canvas display, so that the device independent commands are executed from the plurality of automated test flows via the virtual environment independent of specific physical devices;

receiving, via an output interface comprising at least one processor, automated test results data responsive to execution of the one or more device independent commands via a message based testing protocol and further configured to display the results to the user; and responsive directly to system modeling metadata generated by the System Model, automatically recording, via an analysis manager comprising at least one processor, test results; conducting automated analysis consistent with the System Model; and providing the results data in a predetermined format to the output interface based at least in part on extracted sensor data from the system under test;

Wherein the test and retest engine comprises a software library that stores and manages a plurality of versions of a software to execute as one or more systems under test.

8. The method of claim 7, wherein the plurality of systems of tests further comprise at least one system under test executing on a native environment on hardware.

9. The method of claim 7, wherein the output interface is automatically configured to display one or more displays associated with one or more systems under test during execution of the one or more device independent commands.

10. The method of claim 7, wherein the automated test and retest engine comprises a test manager configured to manage a plurality of automated test procedures for one or more systems under test.

11. The method of claim 7, wherein the analysis manager is further configured to receive the output data from the system under test and automatically generate one or more outputs based on the output data.

12. The method of claim 7, wherein the input interface is configured to manage one or more files associated with the system under test.

* * * * *